United States Patent
Bell et al.

(10) Patent No.: US 7,054,965 B2
(45) Date of Patent: May 30, 2006

(54) COMPONENT FOR USE AS A PORTABLE COMPUTING DEVICE AND POINTING DEVICE

(75) Inventors: Jory Bell, San Francisco, CA (US); Michael Prichard, Oakland, CA (US); Nicholas G. L. Merz, San Carlos, CA (US); Jonathan Betts-LaCroix, Chatsworth, CA (US)

(73) Assignee: OQO Incorporated, San Francisco, CA (US)

( * ) Notice: Subject to any disclaimer, the term of this patent is extended or adjusted under 35 U.S.C. 154(b) by 0 days.

(21) Appl. No.: 10/391,277

(22) Filed: Mar. 18, 2003

(65) Prior Publication Data

US 2004/0186935 A1    Sep. 23, 2004

(51) Int. Cl.
*G06F 13/00* (2006.01)

(52) U.S. Cl. .............................. 710/72; 710/2; 710/17; 710/100; 710/300; 345/1.1; 345/2.2; 345/156; 345/169

(58) Field of Classification Search ................ 710/2–4, 710/17–19, 100, 106, 72–74, 62–63, 300–304; 345/1.1–1.3, 2.1–2.3, 156, 169
See application file for complete search history.

(56) References Cited

U.S. PATENT DOCUMENTS

| | | | |
|---|---|---|---|
| 3,768,074 | A | 10/1973 | Sharp et al. |
| D267,092 | S | 11/1982 | Chadima, Jr. |
| D267,491 | S | 1/1983 | Chadima, Jr. |
| 4,479,198 | A | 10/1984 | Romano et al. |
| 4,484,273 | A | 11/1984 | Stiffler et al. |
| 4,501,460 | A | 2/1985 | Sisler |
| 4,608,631 | A | 8/1986 | Stiffler et al. |
| D287,724 | S | 1/1987 | Crowley et al. |
| 4,680,674 | A | 7/1987 | Moore |
| 4,727,475 | A | 2/1988 | Kiremidjian |
| 4,769,764 | A | 9/1988 | Levanon |
| 5,227,957 | A | 7/1993 | Deters |
| 5,264,992 | A | 11/1993 | Hogdahl et al. |
| 5,329,427 | A | 7/1994 | Hogdahl |
| 5,463,742 | A | 10/1995 | Kobayashi |

(Continued)

FOREIGN PATENT DOCUMENTS

EP    1046978 A1    10/2000

(Continued)

OTHER PUBLICATIONS

B. Brown, "Quick PDA Data Exchange" PC Magazine, May 22, 2001, http://www.pcmag.com/article2/0,4149,225119,00.asp.

(Continued)

*Primary Examiner*—Christopher B. Shin
(74) *Attorney, Agent, or Firm*—Robert Plotkin, P.C.

(57) ABSTRACT

A core component is disclosed which includes a processing module and a touch screen. The core component may operate by itself in a first mode to perform functions similar to that of a conventional personal digital assistant (PDA). In particular, the touch screen may both provide visual output and receive input from a user's finger when the core component operates in the first mode. When the core component is connected to another component including a display screen, the core component may operate in a second mode in which input received through the touch screen is provided to the other component. For example, the movement of a user's finger may control the position of a cursor displayed on a screen of the other component so that the core component exhibits the behavior of a trackpad when operating in the second mode.

30 Claims, 18 Drawing Sheets

U.S. PATENT DOCUMENTS

| | | | |
|---|---|---|---|
| 5,497,490 | A | 3/1996 | Harada et al. |
| 5,600,800 | A | 2/1997 | Kikinis et al. |
| 5,602,721 | A | 2/1997 | Slade et al. |
| 5,689,654 | A | 11/1997 | Kikinis et al. |
| 5,692,123 | A | 11/1997 | Logghe |
| 5,745,733 | A | 4/1998 | Robinson |
| 5,768,100 | A | 6/1998 | Barrus et al. |
| 5,786,984 | A | 7/1998 | Bonardi |
| 5,842,013 | A | 11/1998 | Kopp |
| 5,948,047 | A | 9/1999 | Jenkins et al. |
| 5,978,821 | A | 11/1999 | Freeny |
| 5,983,073 | A | 11/1999 | Ditzik |
| 6,055,647 | A | 4/2000 | Lacombe et al. |
| 6,067,583 | A | 5/2000 | Gilbert |
| 6,134,666 | A | 10/2000 | De Nicolo |
| 6,148,352 | A | 11/2000 | Coale et al. |
| 6,157,533 | A | 12/2000 | Sallam |
| 6,157,958 | A | 12/2000 | Armitage et al. |
| 6,170,026 | B1 | 1/2001 | Kimura et al. |
| 6,243,727 | B1 | 6/2001 | Watts, Jr. |
| 6,286,060 | B1 | 9/2001 | DiGiorgio et al. |
| 6,324,592 | B1 | 11/2001 | Hindman |
| 6,327,152 | B1 | 12/2001 | Saye |
| 6,489,932 | B1 | 12/2002 | Chitturi et al. |
| 2002/0001174 | A1 | 1/2002 | Felcman et al. |
| 2002/0001175 | A1 | 1/2002 | Unrein |
| 2002/0004912 | A1 | 1/2002 | Fung |
| 2002/0004913 | A1 | 1/2002 | Fung |
| 2002/0004915 | A1 | 1/2002 | Fung |
| 2003/0041206 | A1 | 2/2003 | Dickie |

FOREIGN PATENT DOCUMENTS

| | | |
|---|---|---|
| WO | WO 99/47993 A1 | 9/1999 |
| WO | WO 99/66414 A1 | 12/1999 |

OTHER PUBLICATIONS

Sun Microsystems, "Writing PCMCIA Device Drivers", Oct. 1997, http://docs.sun.com/db/doc/802-6321.

Antelope Technologies, On Nov. 7th, 2003, the World's First Modular Computer Will be Publicly Available, and Mobile Computing Will Change Forever . . . , www.antelopetech.com/en/index.aspx, 21 pgs.

Motion Computing, Motion M1200 Pure Tablet PC, http://www.infocater.com/docs/motion/MI200_InfoSheet.pdf, 4.

John G. Spooner, IBM plays with chameleon-like computer, http://news.com.com/2100-1001-830173.html, Feb. 5, 2002, 2.

SlideShow Commander for Palm, Synergy Solutions, Inc. 2001, 25, http://www.synsolutions.com/software/slideshowcommander/manuals/SlideShowCommanderPPC.pdf.

Synaptics, ClearPad Product Brief, http://www.synaptics-uk.com/pdf/clearpad_hand.PDF, 2.

Synaptics, cPad Product Brief, http://www.synaptics.com/pdf/cPad.pdf, 2.

Synaptics, TouchPad Product Brief, http://www.synaptics.com/pdf/touchPad.PDF, 2.

xybernaut, poma, http://www.xybernaut.com/Solutions/product/downloads/XYBpoma.pdf, 2.

xybernaut, Mobile Assistant Transferable Core, MATC, http://www.xybernaut.de/DATEN/MA%20TC_engl.pdf, 4.

Xybernait, Atigo, http://www.xybernaut.com/Solutions/product/downloads/Atigo_Brochure.pdf, 2.

T.D. Kimura, J.R. Gilman, R.A. Livingston, K. Chan, and R.d. Chamberlain, Modubility LLC, Wireless Data Path for a Mobile, Modular Computer System, http://ccrc.wustl.edu/~ roger/papers/kglcc99.pdf, 8.

Modubility, LLC, http:///www.modubility.com/, 19.

Thomas Staudter, The Core of Computing, IBM Research, http://www.research.ibm.com/thinkresearch/pages/2002/20020207_metapad.shtml, 5.

IBM Research News, IBM Research Demonstrates 9-Ounce Prototype Portable Computer to Explore Future Devices, http://www.research.ibm.com/resources/news/20020206_metapad.shtml, 2.

Synaptics, cPad LDC TouchPad, http://www.synaptics.com/products/cpad.cfm, 1.

bsquare, Introducing BSQUARE and our Newest Device Solution: The Power Handheld Reference Design, http://www.bsquare.com/dld-files/customerpresentations/powerhandheldoverview.pdf, 21.

xybernaut, Atigo L, http://www.xybernaut.com/Solutions/product/downloads/Atigo_L_Brochure.pdf, 2.

Antelope Technologies, http://www.anteloptech.com/, 10.

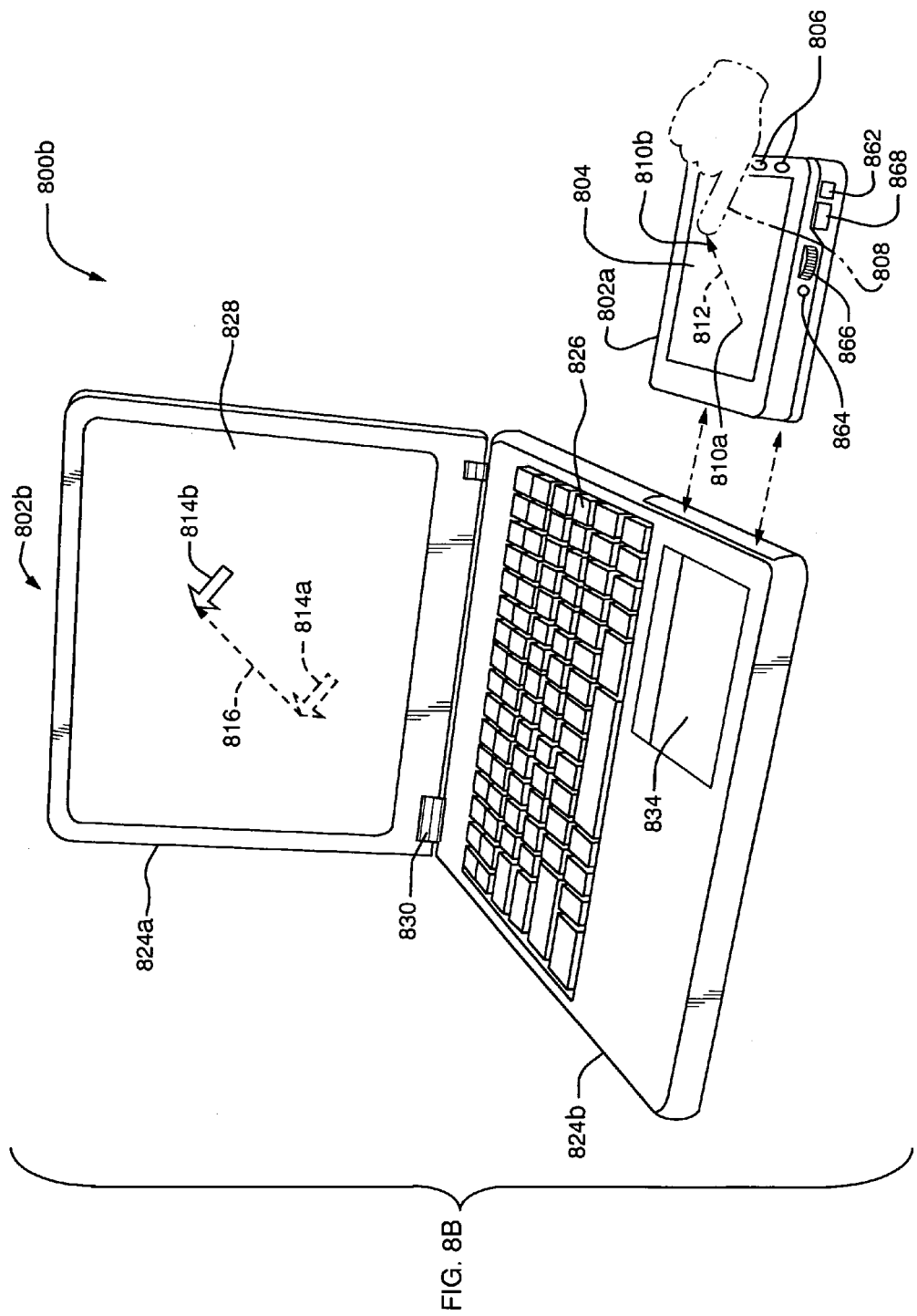

COMPONENT FOR USE AS A PORTABLE COMPUTING DEVICE AND POINTING DEVICE

CROSS REFERENCE TO RELATED APPLICATIONS

This application is related to:

U.S. patent application Ser. No. 10/173,734, filed on Jun. 18, 2002, entitled "Modular Computing System," which is hereby incorporated by reference; and a commonly-owned and concurrently filed patent application entitled "Component for Use as a Portable Computing Device and Pointing Device in a Modular Computing System."

BACKGROUND

1. Field of the Invention

The present invention relates generally to computing systems and, in particular, to modular computing systems whose components may be interconnected in various configurations to perform different functions.

2. Related Art

There is an increasing need for computer systems that are powerful, mobile, and inexpensive. In conventional computer systems, however, there is typically a tradeoff between computing power and mobility, and implementing both increased power and increased mobility within a single system typically results in increased cost. As a result of this tradeoff, most users use a relatively large and immobile computer system, such as a conventional desktop computer system, for applications requiring maximum computing power, and one or more mobile computing systems (such as a cellular telephone and/or a personal digital assistant) for applications where mobility is required. Use of such a multiplicity of computing systems can result in a variety of problems. For example, it can be costly to purchase and maintain several computing devices for performing different functions. It can also be burdensome to travel with several mobile computing devices due to their combined size and weight. The need to store the same or similar data (such as an address book) in several mobile computing devices often requires the user to manually enter such data into each computing device, increasing the amount of time spent by the user performing data entry and increasing the likelihood of inconsistent data across computing devices. It can also be difficult to learn and remember how to use the multiple user interfaces provided by different mobile computing devices.

The above-referenced patent application entitled "Modular Computing System" discloses techniques for avoiding at least some of these problems by providing a computing system in which components may be interconnected in various configurations to perform different functions. The components of such a system may be reconfigured to attain the same form factors as and perform the same functions as a variety of conventional computing devices, such as a laptop computer, a personal digital assistant (PDA), and a tablet computer. Such a system may perform the same functions and provide the same benefits as conventional computing devices more efficiently in terms of cost and size, and without requiring the cumbersome redundant data entry and inconsistent user interfaces described above.

Such a modular computing system presents new opportunities and challenges for re-use of existing system components to perform different functions in different configurations in order to increase the flexibility and power of the system overall. Enabling existing components to perform new functions in different configurations of the system furthers the goal of providing a computing system that is powerful, flexible, portable, and inexpensive.

What is needed, therefore, are improved modular computing systems in which components may be interconnected in various configurations to perform different functions.

SUMMARY

A core component is disclosed which includes a processing module and a touch screen. The core component may operate by itself in a first mode to perform functions similar to that of a conventional personal digital assistant (PDA). In particular, the touch screen may both provide visual output and receive input from a user's finger when the core component operates in the first mode. When the core component is connected to another component including a display screen, the core component may operate in a second mode in which input received through the touch screen is provided to the other component. For example, the movement of a user's finger may control the position of a cursor displayed on a screen of the other component so that the core component exhibits the behavior of a trackpad when operating in the second mode.

Touch screen output (display) may be disabled when the core component operates in the second mode, so that the touch screen operates solely as an input device. The core component may automatically detect whether it is connected to another component having a display screen and automatically configure itself to operate in the first mode when it is not connected to another component, and to operate in the second mode when it is connected to another component having a display screen.

For example, in one aspect of the present invention, a system is provided which includes: a core device including a core computer processor, a core memory, a core storage device, a touch screen, and means for receiving input from and providing output through the touch screen in a first mode of operation of the core device; a secondary display device; means for coupling the core device to the secondary display device; and means for providing input received from the touch screen to the secondary display device in a second mode of operation of the core device. The core device may, for example, operate in the first mode of operation when the core device is not coupled to the secondary display device. The core device may, for example, operate in the second mode of operation when the core device is not coupled to the secondary display device.

In another aspect of the present invention, a method is provided for use in a system including a core device including a core computer processor, a core memory, a core storage device, and a touch screen. The method includes steps of: (A) receiving input from and providing output through the touch screen in a first mode of operation; (B) coupling the core device to a secondary display device; and (C) providing input received from the touch screen to the secondary display device in a second mode of operation of the core device. The method may further include steps of: (D) detecting that the core device has been coupled to the secondary display device; and (E) causing the core device to enter the second mode of operation in response to the detection performed in step (D).

In another aspect of the present invention, a core device is provided which includes: a core computer processor; a core memory; a core storage device; a touch screen comprising touch screen input means and touch screen output means; means for receiving input from and providing output through the touch screen in a first mode of operation of the core device; and means for providing input received from the touch screen to a secondary display device in a second mode of operation of the core device. The means for providing input may, for example, include means for providing input received from the touch screen to the secondary display device only when the core device is coupled to the secondary display device. The means for receiving input may, for example, include means for providing output through the touch screen only when the core device is not coupled to the secondary display device.

In yet another aspect of the present invention, a method is provided for use in conjunction with a core device. The core device includes a core computer processor, a core memory, a core storage device, and a touch screen comprising touch screen input means and touch screen output means. The method includes steps of: (A) receiving input from and providing output through the touch screen in a first mode of operation; and (B) providing input received from the touch screen to a secondary display device in a second mode of operation of the core device. The step (B) may include steps of: (1) determining whether the core device is coupled to the secondary display device; and providing input received from the touch screen to the secondary display device only when the core device is determined to be coupled to the secondary display device. The step (A) may include steps of: (A)(1) determining whether the core device is coupled to the secondary display device; and (A)(2) providing output through the touch screen only when the core device is determined not to be coupled to the secondary display device.

Other features and advantages of various aspects and embodiments of the present invention will become apparent from the following description and from the claims.

BRIEF DESCRIPTION OF THE DRAWINGS

FIG. 8B is a perspective view of two interconnected components, including the core component of FIG. 8A, in which the core component operates in a second mode in which the touch screen performs the functions of a trackpad or stylus-based digitizer, according to one embodiment of the present invention.

DETAILED DESCRIPTION

Most conventional computing systems are composed of subsystems, also referred to herein as "functional modules" or simply as "modules." For example, a conventional computing system may include one or more of each of the following subsystems: (1) an information processing subsystem (which may include, for example, a central processing unit (CPU)), (2) a power input and distribution subsystem (which may include, for example, a power supply and power bus), (3) a user input subsystem (which may include, for example, a conventional mouse, keyboard, and/or trackpad), (4) a user output subsystem (which may include, for example, a conventional monitor and/or printer), (5) a mass media storage and access subsystem (which may include, for example, a conventional hard disk drive), and (6) a network or inter-device communication subsystem (which may include, for example, a conventional network interface card (NIC) or a serial or parallel cable).

The term "computer" is used herein to refer to a system that includes a processing module, a power module, a media storage module, a user input module, and a user output module. A computer, according to this definition, differs from a conventional "appliance" in that an appliance typically lacks some or all of the processing module and/or media storage module of a computer. An appliance therefore typically relies heavily on a connection to a network system or removable media to provide the missing functionality of the processing and/or media storage modules. As used herein, the term "computing system" refers both to computers and to appliances.

Figure 1A:
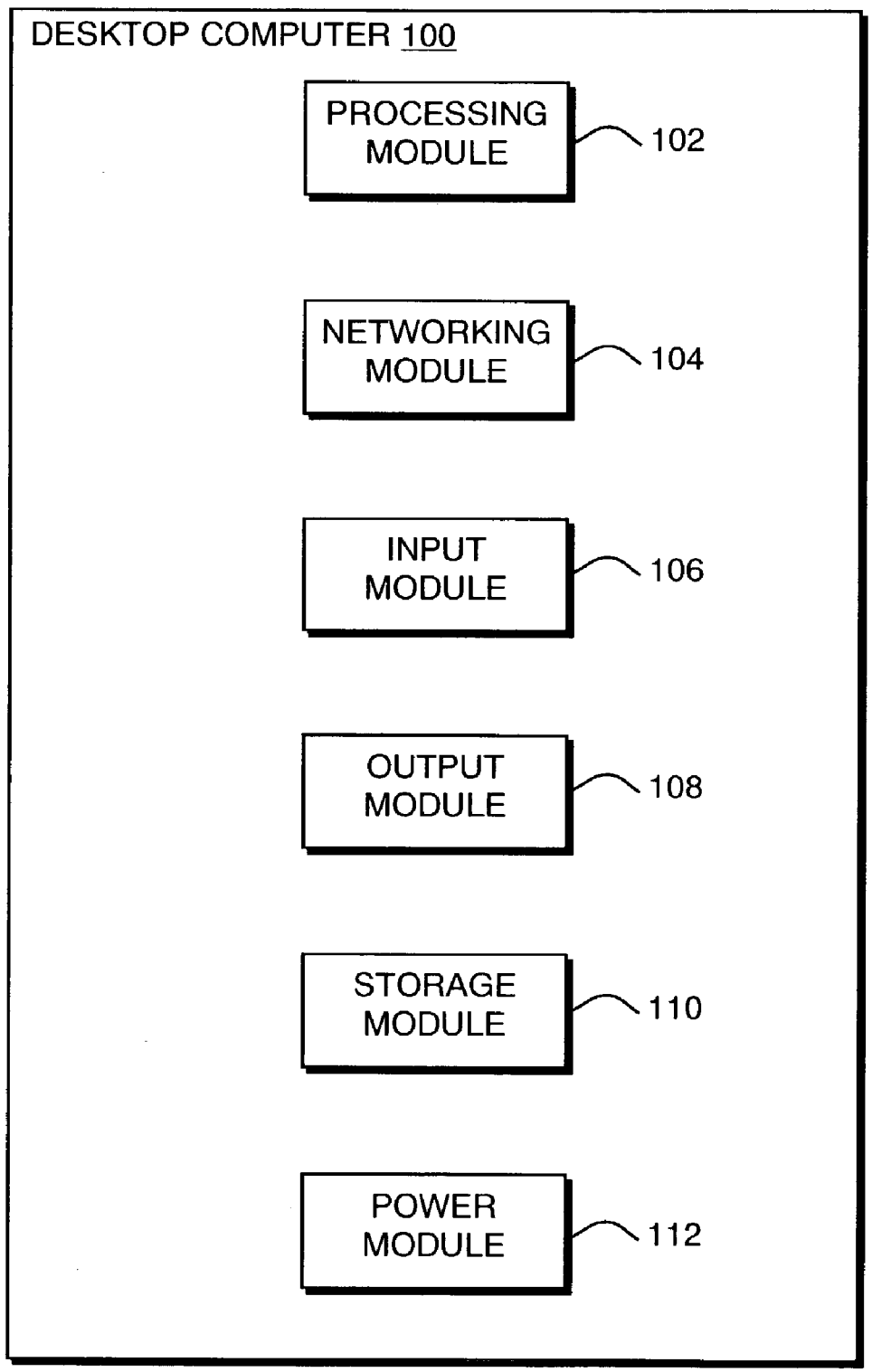
FIG. 1A is a block diagram of the functional modules included in a conventional desktop computer.

Referring to FIG. 1A, one well-known implementation of a modular computing system is the conventional desktop computer 100a, shown in block diagram form. The desktop computer 100a includes a processing module 102, a networking module 104, an input module 106, an output module 108, a storage module 110, and a power module 112. Typically, the entire processing module 102, the entire networking module 104, and most or all of the media storage module are embodied in components contained within a single physical housing. Although such housings have various form factors, some of which (such as the "tower" model) are designed to rest on a floor rather than a desk, all such form factors fall within the desktop computer paradigm as described herein. For purposes of explanation, any such housing and the devices contained within it are referred to herein as the "desktop component" of a desktop computer.

Figure 1B:
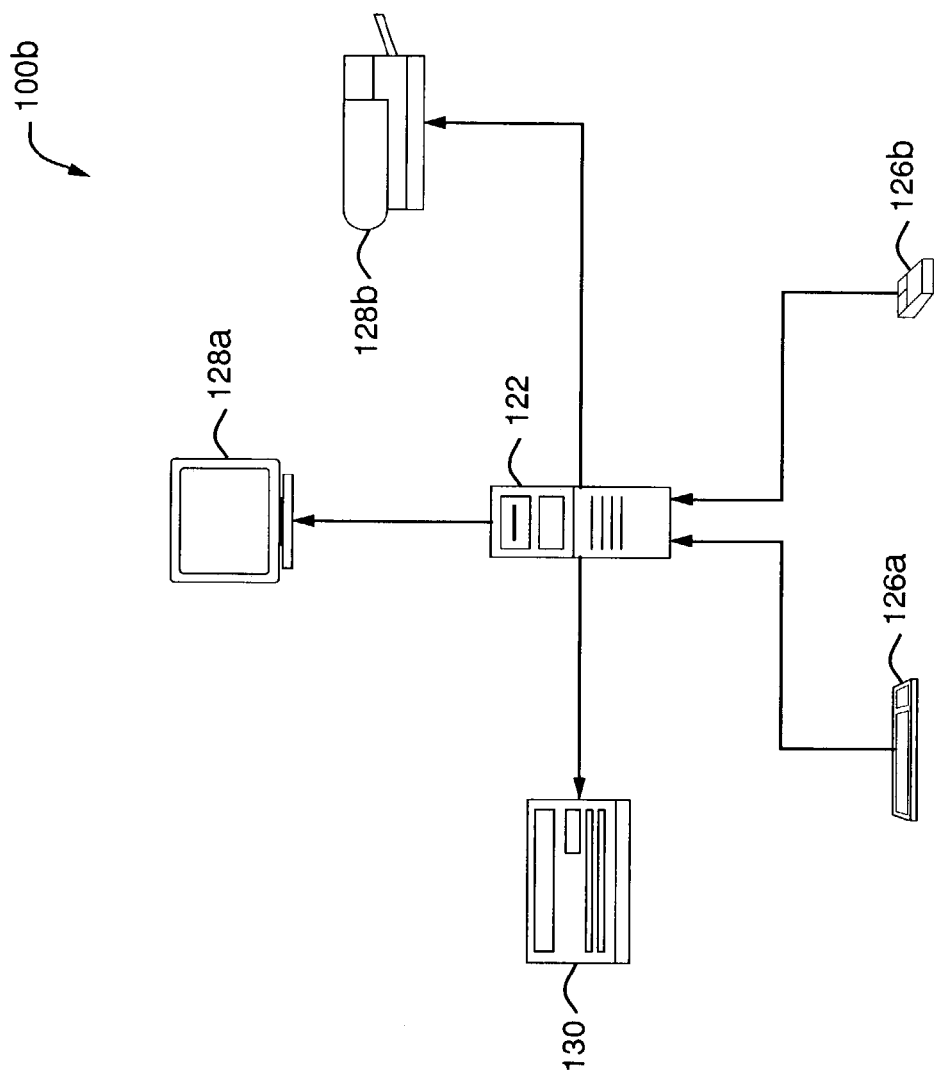
FIG. 1B is a block diagram of the physical modules contained in a conventional desktop computer.

For example, referring to FIG. 1B, the physical components of a typical desktop computer 100b are shown. The desktop computer 100b includes a desktop component 122, a keyboard 126a, a mouse 126b, a monitor 128a, and a printer 128b. The processing module 102 of the desktop computer 100b is embodied in a central processing unit (CPU) and related components within the desktop component 122. Similarly, the networking module 104 of the desktop computer 100b is embodied in a network interface card (NIC) and related components within the desktop component 122, and the power module 112 of the desktop computer 100b is embodied in a power supply, transformer, and related components within the desktop component 122. The input module 106 of the desktop computer 100b consists of a keyboard 126a, a mouse 126b, and related components within the desktop component 122. The output module 108 of the desktop computer 100b consists of a monitor 128a, a printer 128b, and related components within the desktop component 122. The storage module 110 of the desktop computer 100b consists of a hard disk drive (not shown) within the desktop component 122, an external optical storage device 130, and related components within the desktop component 122. The "related components" described above typically include device drivers and other hardware and software for communicating with and controlling the keyboard 126a, mouse 126b, monitor 128a, printer 128b, and optical storage device 130, which are typically referred to as "peripheral devices."

Conventional desktop components typically communicate with peripheral devices (such as the keyboard 126a and the printer 128b) via data ports, wireless streams, or physical connectors having various bandwidths and form factors and employing various protocols. Such peripheral devices are generally powered either independently by power modules unique to each device, or draw power parasitically from the desktop component 122.

A data stream between the desktop component 122 and a peripheral device (such as the keyboard 126a or the printer 128b) is typically required for the peripheral device to perform its intended function. A connection between the peripheral device and the desktop component 122 is required to provide such a data stream. As a result, conventional peripheral devices typically cannot perform their intended function if they are not connected to the desktop component 122. For example, the monitor 128a must typically be connected to the desktop component 122 with a cable in order to display images and other visual information. The monitor 128a standing alone is not capable of displaying visual information because it requires a data stream from the desktop component 122 to provide it with a description of the visual information to display.

Similarly, the desktop component 122 is also typically unable to perform any useful function if it is not connected to appropriate input, output, and power modules. For example, the desktop component 122 would not be able to provide user input to application programs and would not be able to provide user output from such application programs if the desktop component 122 were not connected to appropriate input components (such as the keyboard 126a and mouse 126b) and appropriate output components (such as the monitor 128a).

The physical modularity of a conventional desktop computer (as depicted in FIG. 1B) is thus very closely related to its functional modularity (as depicted in FIG. 1A). The interconnection of several discrete components (e.g., the desktop component 122, the keyboard 126a, and the monitor 128a) is typically necessary to provide the minimal set of functional modules for a functional computer system.

In portable computing systems, such as laptop computers, a single device often encapsulates a set of components that embody user input modules (e.g., keyboard, trackpad, touchpad, buttons, levers, touchscreen, stylus, operating system, etc.), user output modules (e.g., monitor, speakers, LEDs, vibration, etc.), processing modules (e.g., CPU, memory, video processor, decoder), media storage modules (e.g., hard disk drive, flash memory, smart card, ROM), and power modules (e.g., batteries, transformers, super capacitors, solar cells, springs). Encapsulation of input, output, and power modules within a single device is a common way in which portable computing systems address the need for portability. In addition to this encapsulation of multiple functional modules within a single device, portable computing systems often also include peripheral devices that provide the functionality of network modules (e.g., modems), inter-device communication modules (e.g., port replicators, expansion cards), user input modules (e.g., mice, keyboards, microphones), user output modules (e.g., printers, external speakers), and power modules (e.g., external batteries and chargers).

Laptop computers, handheld computers, and personal digital assistants (PDAs) are examples of such portable computing systems. Devices such as MP3 players, calculators, and handheld voice recorders are also portable computers with processing, input, output, power, and media modules specifically scaled and tailored to these niche devices. Among portable computer systems are also specialized "media readers" such as digital phones, pagers, digital cameras, tape players, CD players, wireless email devices, portable DVD-players, mini-disc players, and portable game players, which read a stream of media to the user, either from a wireless source or from a removable media source. These readers, like appliances, may have some or all of their processing or media storage modules abstracted over a network or removable device.

As described above, conventional computing systems typically present an undesirable tradeoff between computing power and mobility. Another problem with conventional computing systems is that their structure typically involves a "central" component (such as the desktop component 122 in FIG. 1B) to which all other components must be connected in order for the system to operate. In such a computing system, components other than the desktop component 122 (such as the keyboard 126a and the printer 128b) are considered to be "peripherals." Typically, such peripherals can only operate when they are connected to the desktop component 122 and can only communicate with each other through the desktop component 122. Such centralization of control and communication can lead to inefficient use of resources (such as processing cycles and memory) and increase the overall physical size of the computer system.

Portability of computer systems has become increasingly necessary in recent years. In response to this need, a wide variety of handheld devices, such as personal digital assistants (PDAs), cellular telephone, MP3 players, CD players, and digital audio recorders, have proliferated. Typically, each such handheld device is dedicated to performing a single task or a closely related set of tasks, such as playing music or facilitating telephone communication.

Although such devices may individually be portable, the proliferation of such devices has led to a variety of problems. For example, because each handheld device typically performs a narrow range of tasks, users who require a variety of mobile services often acquire a variety of handheld devices, each of which provides a different mobile service. For example, a single user may own or use a cellular telephone, PDA, CD player, laptop computer, and digital voice recorder. As a result, it can be very costly for a user to acquire all of the mobile devices necessary to meet his or her needs. Furthermore, it can be cumbersome to transport multiple handheld devices due to their combined size and weight, thereby defeating the original goal of mobility.

Different mobile devices often provide the same or similar features, such as an electronic address book. Such redundancy is inefficient and increases the total size and cost of designing, manufacturing, and purchasing multiple mobile devices. Furthermore, it is necessary for the user to learn how to use each mobile device, which can be time-consuming. Even when two different mobile devices provide the same feature, such as an electronic address book, the user interface to such a feature typically differs from device to device. Remembering how to use a large number of user interfaces can be difficult and frustrating, and can lead to the user making an error (such as a data entry error) when operating one of the user interfaces.

The same or similar data is often stored in and processed by multiple mobile devices owned by the same user. For example, a user's laptop computer, PDA, and cellular telephone may all store the same electronic address book. Such redundant data storage can represent an inefficient use of resources and increase the total storage requirements and size of the devices owned by the user.

Some mobile devices are not capable of communicating with each other, leading to a variety of problems. For example, in cases where the same data is stored on multiple mobile devices, the inability of the devices to communicate with each other may make it necessary for the user to manually enter the same data into each of the mobile devices. This can be a time-consuming and error-prone process. Furthermore, the redundant data stores may become out-of-sync as the user modifies each of them independently (e.g., by adding an address to the address book stored on a PDA and deleting an address from the address book stored in a cellular phone). If the mobile devices are unable to communicate with each other, it may be extremely difficult for the user to keep all of the data stores synchronized. In some cases the user can synchronize the multiple data stores by manually initiating a synchronization process (such as by connecting one of the mobile devices to the desktop component 122 and executing software on the desktop component 122 that synchronizes the desktop component's data store with the mobile component's data store). Such synchronization, however, is time consuming and can still lead to corruption and/or loss of data if not performed carefully.

Before describing various aspects and embodiments of the present invention, various terms will be defined.

As used herein, the term "functional module" refers to a set of hardware and/or software in a computing system that performs a particular function. The terms "subsystem" and "module" are used synonymously with "functional module" herein. For example, a display module in a conventional desktop computer may include the computer's CPU, graphics card, video memory, monitor, and portions of the operating system that process display information. Examples of other modules include processing modules, input modules, and power modules. A functional module may be embodied in hardware, software, data and/or instruction streams, and any combination thereof. A single physical device in a computer system may be part of more than one functional module.

In some cases a particular functional module may present an interface to a user through a particular device. For example, a user may interact with an input module using a keyboard, or an output module through a display monitor. It should be appreciated that the term "functional module" as used herein refers not only to such user interface devices, but to any additional hardware and/or software within the computing system (such as buses and drivers) that are used to perform the function of the functional module.

A single functional module may include one or more units of hardware and/or software for performing the module's function. For example, a single input module may include a keyboard or both a mouse and a keyboard for obtaining user input.

As used herein, a "class" of functional module refers to a set of functional modules that perform the same function. For example, processing modules constitute a class of functional modules, as do input modules, display modules, storage modules, power modules, and network modules. Therefore, for example, two different processing modules are in the same class of functional module, while a processing module and an input module are not in the same class of functional module.

As used herein, the term "component" refers to a physical unit of a computing system. As used herein, the term "physical module" is synonymous with "component." A component may include hardware, software, or any combination thereof. A computing system is physically composed of physical modules and functionally composed of functional modules. Examples of components include CPUs, peripheral devices (such as monitors, keyboards, and printers), application software programs, and operating systems.

There may be any mapping between functional modules and physical modules (components) in a computing system. For example, a single functional module may be implemented using a single component, multiple components, a part of a component, or any combination thereof. Similarly, a component may implement a single functional module, multiple functional modules, or a part of a functional module. If a physical system (such as a component or a set of components) performs the function of a functional module, the physical system is said to "implement" or "embody" the functional module.

As used herein, the term "component set" refers to a set of components including at least one subset of components that may be interconnected to form a computing system. It need not be possible to contemporaneously interconnect all of the components in a component set to form a computing system. For example, a component set may include two display components although it may not be possible to contemporaneously use both display components in conjunction with other components in the component set. Examples of components sets are shown and described in more detail below with respect to FIGS. 2A–2B.

As used herein, the term "computer" refers to a system that includes an information processing module, a power module, a user input module, a user output module, and a storage module. These modules are interconnected to form a unified system that is powered by the power module, receives user input using the user input module, processes the user input (and other information) using the processing module, provides user output using the user output module, and stores user input (and other information) using the storage module. Examples of computers include conventional desktop computers and laptop computers.

As used herein, the term "appliance" refers to a device that includes a power module, a user input module, and a user output module, but that lacks components that provide some or all of the functionality of a conventional computer processing module and/or storage module. An appliance therefore may rely at least in part on a connection to a network system or removable media to provide the missing functionality of the processing and/or media storage modules. The modules in an appliance are interconnected to form a unified system that is powered by the power module, receives user input using the user input module, processes the user input (and other information) using the (at least partially external) processing module, provides user output using the user output module, and stores user input (and other information) using the (at least partially external) storage module. Examples of appliances include personal digital assistants, cellular telephones, and web pads.

As used herein, the term "computing system" refers to both computers and appliances. A computing system includes an input module, an output module, a power module, a processing module, and a storage module. A computing system may also include other modules, such as an interdevice communication module.

As used herein, the term "input module" refers to any functional module (subsystem) that provides input to a computing system. Input modules may include devices such as keyboards, mice, styluses, trackballs, touch location devices such as trackpads (also referred to as "touchpads") and touch screens, microphones, scanners, cameras and video capture devices, wireless receivers, buttons, and switches. Input may, for example, be obtained by the input module as the result of actions performed by a user (such as typing on a keyboard). Input may, however, be obtained without user activity. For example, a network interface card may receive input over a network from another computer performing automated actions, and a digital camera may be configured to periodically capture images and provide them as input to a computing system without further interaction from the user.

As used herein, the term "output module" refers to any functional module (subsystem) that provides output to a user, to another module, or to another computing device. Output modules may include, for example, devices such as display monitors, speakers, printers, projectors, and wireless transmitters.

As used herein, the term "processing module" refers to any functional module (subsystem) that processes information. Processing modules may include one or more kinds of processor in any combination, such as a central processing unit (CPU), graphics processing unit, math co-processing unit, or a digital signal processor.

As used herein, the term "storage module" refers to any functional module (subsystem) that stores digital information. Storage modules may include devices such as RAM, ROM, hard disk drives, floppy disk drives, optical drives (such as CD-ROM, CD-R, CD-RW, DVD-RAM, or DVD-ROM drives), or tape drives.

As used herein, the term "interdevice communication module" refers to any functional module (subsystem) that enables a component to communicate with another component. Typically, each component that is to communicate with another component contains its own interdevice communication module. Interdevice communication modules may enable communication over any kind of connection, such as serial cables, parallel cables, USB cables, or wireless connections. Interdevice communication modules may include devices such as serial controllers, parallel controllers, and network interface cards (NICs).

It should be appreciated that the particular classes of functional module described above are provided purely for purposes of example and do not constitute limitations of the present invention. For example, although an "input module" is described above, a particular computing system may include multiple input modules, such as a user input module, an audio input module, and a video input module. Various other kinds of modules may also be used by components according to embodiments of the present invention.

As used herein, the term "configuration" refers to a unique subset of components in a component set that may be interconnected to form a computing system. For example, assume for purposes of example that a component set includes a first component, a second component, and a third component. If the first component and the second component may be interconnected to form a computing system, then the first and second components so interconnected constitute a configuration of the component set. Similarly, if the first component, the second component, and the third component may be interconnected to form a computing system, then the first, second, and third components so interconnected constitute a configuration of the component set. Furthermore, if the first component may operate on its own as a computing system, then the first component also constitutes a configuration of the component set.

Components are "interconnected" if they are coupled in any manner, such as through physical, electrical, and/or wireless connections that enable the components to communicate with each other and operate as a computing system.

The description herein may refer to "redundant functional modules" and/or to "redundancy" of functional modules. It should be appreciated that such terms need not refer to exact duplication of functionality or to exact duplication of structure used to implement functionality. Rather, any two functional modules that perform the same function (i.e., of the same class) within a computing system constitute redundant functional modules. For example, two processing modules may constitute redundant functional modules, even if the two modules do not use the same hardware (e.g., the same processors) or perform the same processing tasks. As long as they perform the function of a processing module within the computing system, they are redundant processing modules. The same is true, for example, for input modules, display modules, and storage modules.

In one aspect, the present invention features a component set including a plurality of components that include a plurality of functional modules. At least one of the functional modules is implemented by at least two different subsets of the component set. For example, two of the components may each provide an implementation of one of the functional modules (such as the processing module). As a result of this redundant functional modularity, the components and subsets thereof may be flexibly rearranged and interconnected into a variety of computing systems without requiring the use of a particular component in every one of the configurations to perform the function of a particular functional module.

Assume, for example, that there are n subsets $S_1$–$S_n$ of the component set that may be interconnected to form computing systems. The members of each of the subsets $S_1$–$S_n$ form a unique set of components that may be interconnected to form a computing system. Using the terminology defined above, each of the subsets $S_1$–$S_n$ is a configuration of the component set. In one aspect of the present invention, no component of the component set is a member of all of the subsets $S_1$–$S_n$. This differs, for example, from the conventional desktop computer 100b, in which the desktop component 122 is always a component of the desktop computer 100b, regardless of which peripheral devices are included in the desktop computer 100b.

Figure 2A:
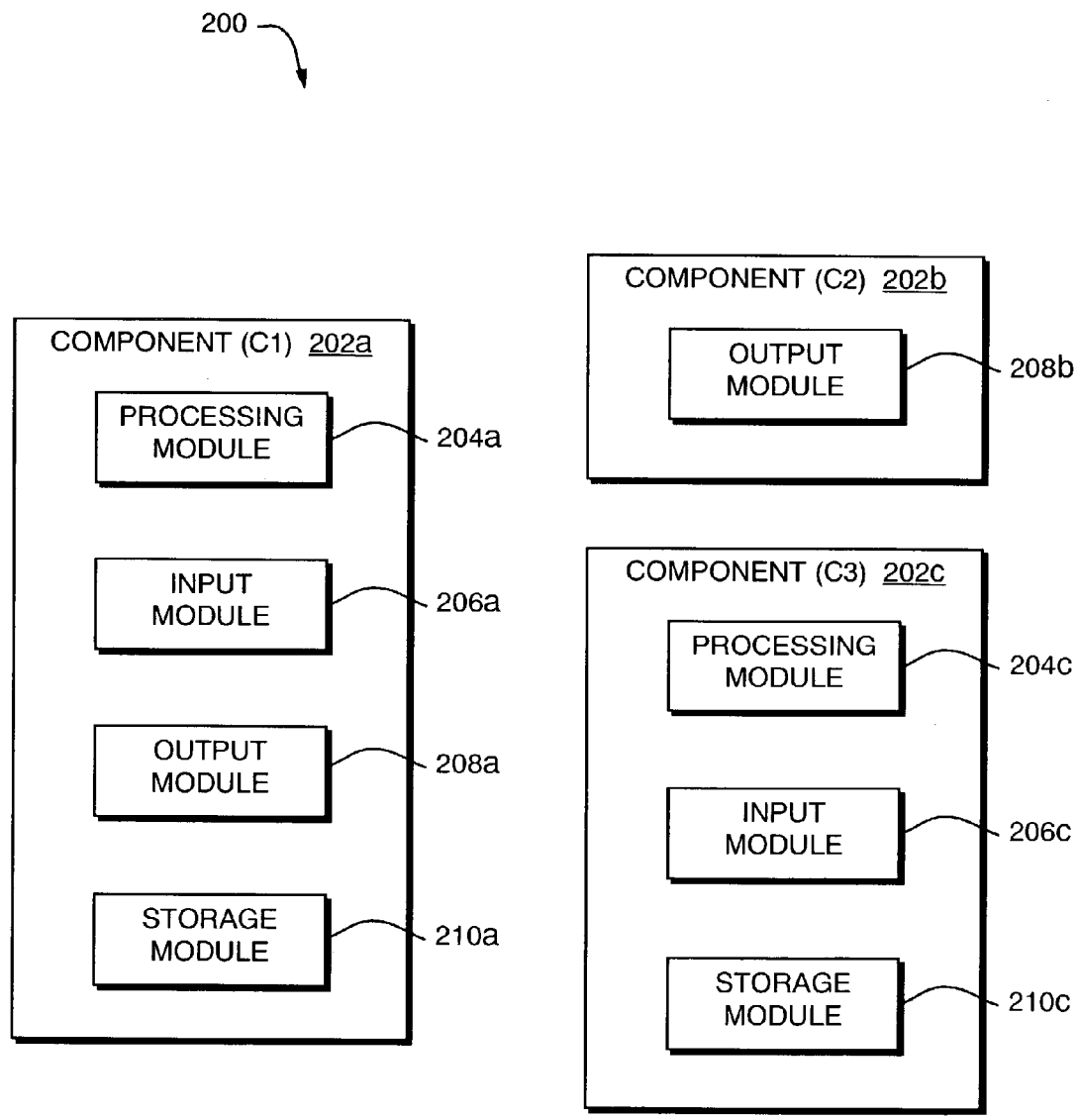
FIG. 2A is a block diagram of a set of components according to one embodiment of the present invention.
Figure 2B:
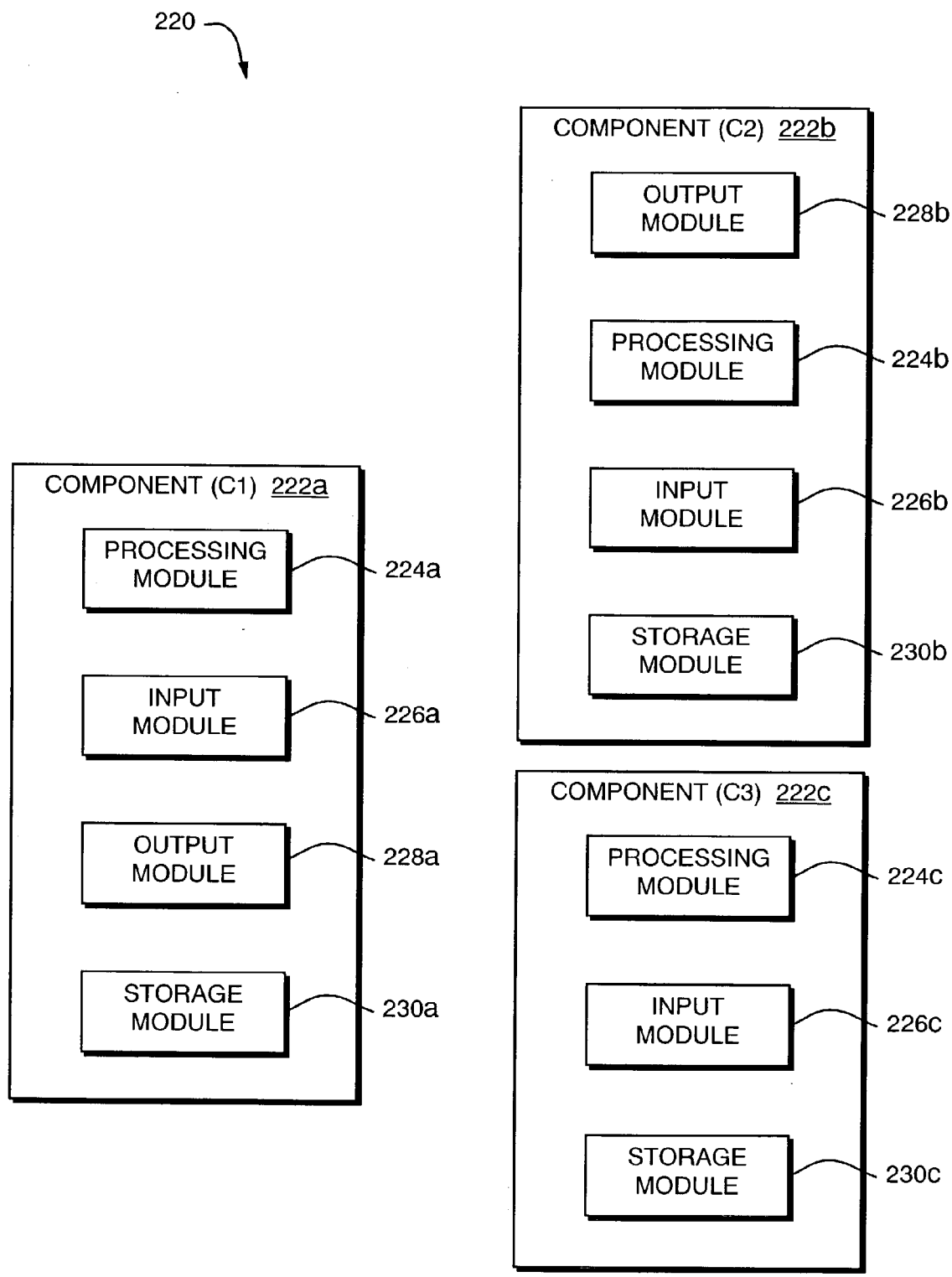
FIG. 2B is a block diagram of a set of components according to another embodiment of the present invention.

Referring to FIG. 2A, a more concrete example is provided of the redundant functional modularity that is provided according to one aspect of the present invention. A component set 200 includes a first component 202a, a second component 202b, and a third component 202c. Assume for purposes of example that a computing system requires only a processing module, an input module, an output module, and a storage module. The first component 202a includes a first processing module 204a, a first input module 206a, a first output module 208a, and a first storage module 210a. The second component 202b includes a second output module 208b. The third component 202c includes a second processing module 204c, a second input module 206c, and a second storage module 210c.

It should be appreciated that the component set 200 includes redundant processing modules (the processing module 204a of the first component 202a and the processing module 204c of the third component 202c), redundant input modules (the input module 206a of the first component 202a and the input module 206c of the third component 202c), and redundant storage modules (the storage module 210a of the first component 202a and the storage module 210c of the third component 202c). Advantages resulting from these redundant functional modules will be described in more detail below.

Figure 3A:
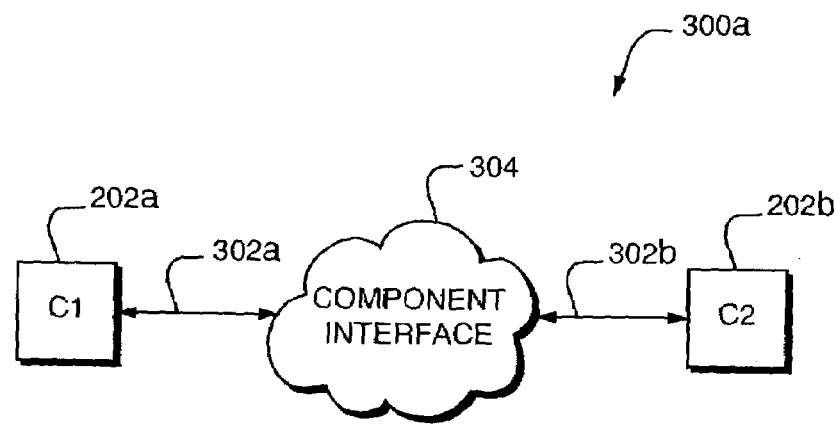
FIGS. 3A–3E are block diagrams of configurations of the component set of FIG. 2A according to various embodiments of the present invention.

Referring to FIG. 3A, in a first configuration 300a of the component set 200, the first component 202a is connected to a component interface 304 by first connector 302a, and the second component 202b is connected to the component interface 304 by second connector 302b. The first component 202a and the second component 202b communicate with each other via the component interface 304 and the connectors 302a–b.

It should be appreciated that the component interface 304 and connectors 302a–b, shown in generalized form for ease of illustration, may be implemented in any of a variety of ways. Particular examples of techniques for implementing component interface 304 and connectors 302a–b are described in more detail below with respect to FIGS. 7A–7C. Although component interface 304 and connectors 302a–b are shown as distinct elements in FIGS. 3A–3D, they may be implemented using the same hardware and/or software.

The first configuration 300a is a computing system that utilizes (for example) the processing module 204a of the first component 202a, the input module 206a of the first component 202a, the storage module 210a of the first component 202a, and the output module 208b of the second component 202b. The computing system formed by the first configuration 300a therefore utilizes functional modules from both the first component 202a and the second component 202b.

Figure 3B:
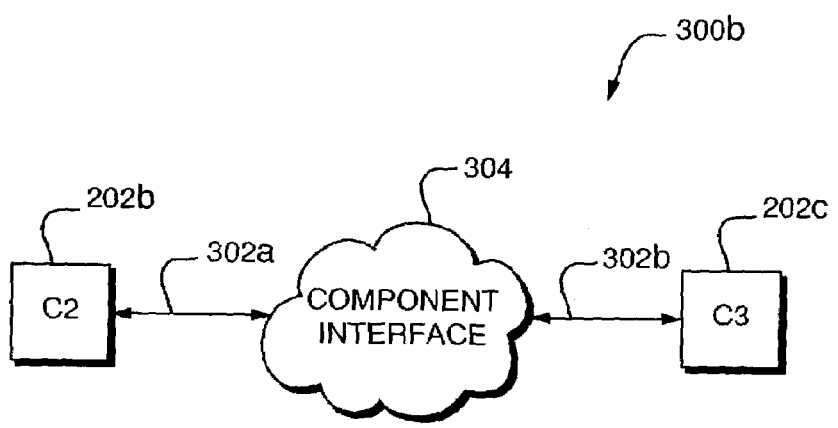

Referring to FIG. 3B, in a second configuration 300b of the component set 200, the second component 202b is connected to the component interface 304 by first connector 302a, and the third component 202c is connected to the component interface 304 by second connector 302b. The second component 202a and the third component 202c communicate with each other via the component interface 304 and the connectors 302a–b.

The second configuration 300b is a computing system that utilizes (for example) the processing module 204c of the third component 204c, the input module 206c of the third component 202c, the storage module 210c of the third component 202c, and the output module 208b of the second component 202b. The computing system formed by the second configuration 300b therefore utilizes functional modules from both the second component 202b and the third component 202c.

Figure 3C:
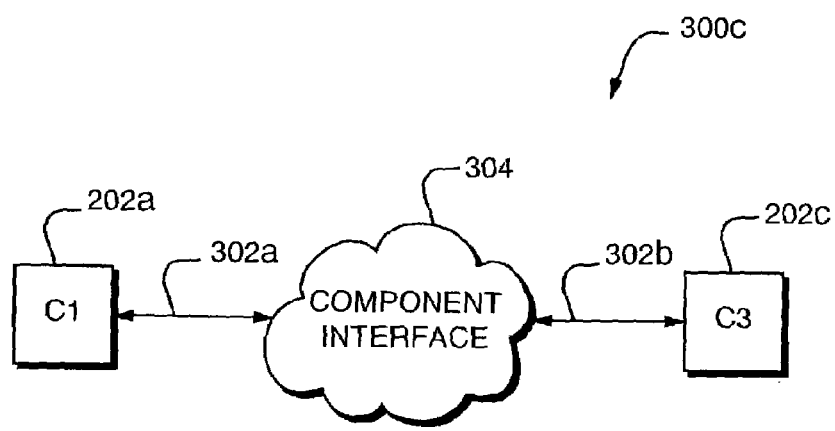
Figure 3D:
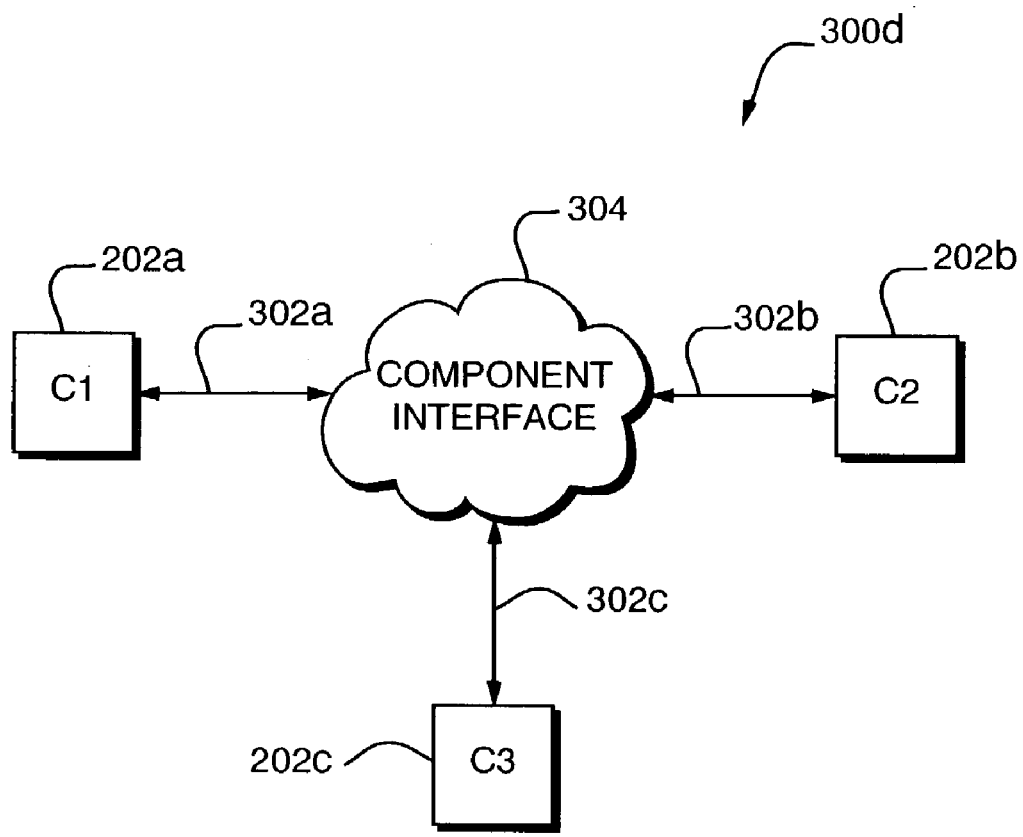

Referring to FIG. 3C, in a third configuration 300c of the component set 200, the first component 202a is connected to the component interface 304 by first connector 302a, and the third component 202c is connected to the component interface 304 by second connector 302b. The first component 202a and the third component 202c communicate with each other via the component interface 304 and the connectors 302a–b.

The third configuration 300c is a computing system that utilizes (for example) the processing module 204c of the third component 204a, the input module 206c of the third component 202c, the storage module 210c of the third component 202c, and the output module 208a of the first component 202a. The computing system formed by the third configuration 300c therefore includes functional modules from both the first component 202a and the third component 202c.

It should be appreciated that none of the components 202a–c in the component set 200 is included in all three of the configurations 300a–c shown in FIGS. 3A–3C, and that no one component is exclusively relied upon to provide the processing module necessary to form a computing system. This differs from the conventional desktop computer 100b (FIG. 1B), in which the desktop component 122 is a required component in any configuration because the desktop component's processing module is required to form a computing system. The lack of dependency on any particular component exhibited by the component set 200 shown in FIG. 3A results from the inclusion of redundant functional modules in the component set 200. For example, the inclusion of a processing module in both the first component 202a and the third component 202c allows either the first component 202a or the third component 202c to provide the processing module necessary to form a complete computing system.

This redundancy of functional modules enables flexibility in configuring different subsets of the component set 200 into different computing systems, so long as each configuration includes all of the functional modules necessary to form a computing system. It should be appreciated that functional modules other than the processing module may be implemented by multiple components of a component set. Various other examples of redundant functional modules will be described in more detail below.

Furthermore, it should be appreciated that although the configurations 300a–c shown in FIGS. 3A–3C each includes exactly two components, a configuration may include any number of components. For example, referring to FIG. 3D, a fourth configuration 300d is shown in which the first component 202a, the second component 202b, and the third component 202c are interconnected by the component interface 304 and connectors 302a–c to form a computing system. The fourth configuration 300d is a computing system that utilizes (for example), the processing module 204a of the first component 202a, the input module 206a of the first component 202a, the output module 208b of the second component 202b, and the storage module 210c of the third component 202c.

Similarly, a configuration may consist of a single component. For example, referring to FIG. 3E, a fifth configuration 300e of the component set 200 is shown that consists of the first component 202a. The fifth configuration 300e is a computing system that utilizes the processing module 204a, the input module 206a, the output module 208a, and the storage module 210a of the first component 202a.

Another advantage of the redundant functional modularity described above is that the components in a component set may perform different functions in different configurations of the component set. For example, consider again the component set 200 shown in FIG. 3A. As described above, the second configuration 300b (FIG. 3B) utilizes the processing module 204c, the input module 206c, and the storage module 210c of the third component 202c, while the second component 202b provides the output module 208b. Therefore, in the second configuration 300b, the third component performs functions similar to those performed by a conventional desktop computer and the second component 202b performs functions similar to those performed by a conventional monitor. In contrast, in the third configuration 300c (FIG. 3C), the third component 202c provides (for example) only its storage module 210c, while the first component 202a provides its processing module 204a, input module 206a, and output module 208a. Therefore, in the third configuration 300c, the third component 202c performs functions similar to those performed by a conventional hard disk drive.

Additional examples in which components perform different functions in different configurations are provided below. The ability of components in various embodiments of the present invention to perform different functions in different configurations is advantageous because it enables components to automatically adapt to different configurations and to perform the functions for which they are most well-suited in a particular configuration. For example, if the processing module 204a of the first component 202a is more powerful than the processing module 204c of the third component 202c, the more powerful processing module 204a of the first component 202a may be used when the first component 202a and the third component 202c are interconnected in a configuration (such as the third configuration 300c shown in FIG. 3C). The less powerful processing module 204c of the third component 202c may be used, however, when the third component 202c is included in a configuration with other components having less powerful processing modules or no processing modules (such as the second configuration 300b shown in FIG. 3B).

A further advantage of the redundant functional modularity described above is that one or more components in a component set may each be a complete computing system. For example, referring to FIG. 2B, a component set 220 includes a first component 222a, a second component 222b, and a third component 222c. The first component 222a includes a first processing module 224a, a first input module 226a, a first output module 228a, and a first storage module 230a. The second component 202b includes a second output module 208b, a second processing module 224b, a second input module 226b, and a second storage module 230b. The third component 202c includes a third processing module 204c, a third input module 206c, and a third storage module 210c.

A first configuration of the component set 220 includes the first component 222a and the second component 222b. The first configuration includes the processing module 224a of the first component 222a, the input module 226a of the first component, the storage module 230a of the first component, and the output module 228b of the second component. In the first configuration, therefore, the second component 222b provides only the output module 228b and therefore performs functions similar to those provided by a conventional monitor.

Recall that for purposes of the present discussion it is assumed that a computing system requires only a processing module, input module, output module, and storage module. For example, it is assumed for purposes of simplicity in the present discussion that a computing system does not require a power module. When the second component 222b is disconnected from the first component 222a, therefore, the second component 222b may operate independently as a computing system, because the second component 222b includes all of the necessary modules (i.e., the output module 228b, the processing module 224b, the input module 226b, and the storage module 230b). Therefore, although the second component 222b in some ways behaves similarly to a conventional monitor when connected to the first component 222a, the second component 222b may operate as a standalone device when disconnected from the first component 222a, unlike a conventional monitor. This ability of the second component 222b (and more generally, of any component that includes all of the functional modules of a computing system) to continue to operate on its own advantageously increases the number of configurations that may be formed from the component set 220 and increases the usefulness of components in the component set 220 as mobile computing devices. Components in a component set need not become dormant peripheral devices when they are disconnected from other components in the component set. In fact, since there is no single centralized component to which other components must connect to form a computing system, no component in the component set is "peripheral" to other components. This elimination of a centralized, hierarchical structure to the component set advantageously provides additional flexibility and functionality to the configurations that may be formed from the components in the component set.

It is not a requirement of the present invention, however, that every component in a component set include all of the functional modules of a computing system. Rather, one or more components in a component set may include fewer than all functional modules of a computing system and therefore not be capable of operating as a standalone computing system.

In the examples provided above, each configuration is said to utilize exactly one functional module of each class of functional module (e.g., processing, input, output, and storage). It should be appreciated that this is not a limitation of the present invention. Rather, multiple functional modules of the same class may be utilized within a single configuration in a variety of ways. For example, in one embodiment of the present invention, in a particular configuration including two functional modules of the same class, such as two storage modules, one component in the configuration may use one of the storage modules for storage, while another component in the configuration may use the other storage module for storage.

In another embodiment, the inclusion of two functional modules of the same class in a single configuration may also enable one of the two functional modules to be used as a backup in the event that the other functional module fails or becomes unavailable. For example, consider the configuration 300c (FIG. 3C). Assume that in normal operation the processing module 204a of the first component 202a performs the processing function of the configuration 300c. For example, the first component's processing module 204a may be more powerful than the third component's processing module 204c and therefore be more desirable for use. In the event, however, that the processing module 204a fails, the configuration 300c may switch to using the processing module 204c of the third component 202c to perform processing functions.

In a further embodiment, load balancing may be performed among multiple functional modules of the same class to more efficiently perform a particular function. For example, load balancing may be performed across two or more processing modules (such as the processing module 204a and the processing module 204c in the configuration 300c shown in FIG. 3C) to distribute processing tasks between the processing modules using any of a variety of well-known load balancing techniques.

Two functional modules of the same class may be used contemporaneously to perform the function more efficiently. For example, two or more processing modules may be operated in parallel to perform processing tasks more efficiently. Two or more output modules including display monitors may be operated contemporaneously to provide a larger virtual display area or to contemporaneously provide two display areas. Two input modules including different input devices (such as a mouse and a keyboard) may be operated simultaneously to provide the user with multiple input modes. Multiple storage modules (such as those including a hard disk drive and a floppy disk drive) may be provided to enable the user to access multiple storage media. It should be appreciated that the present invention is not limited to these particular examples.

In another embodiment, the present invention features a component set including a plurality of components that include a plurality of functional modules. In a first configuration of the component set, all of the components are interconnected to form a first computing system. A second configuration of the component set includes a first subset of the component set that includes fewer than all of the components in the component set. The second configuration forms a second computing system. A third configuration of the component set includes a second subset of the component set that includes fewer than all of the components in the component set. The first subset and the second subset are disjoint, i.e., none of the components in the component set is included in both the first subset and the second subset.

Figure 3E:
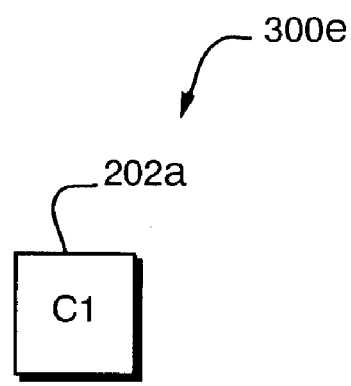

As a result, it is possible to interconnect all of the components in the component set to form a computing system, and also to form at least two computing systems from disjoint subsets of the component set. For example, referring again to the component set 200 (FIG. 2A), all of the components 202a–c may be interconnected to form a computing system (FIG. 3D), and it is also possible to form computing systems from at least two disjoint subsets of the component set 200 (as shown in FIGS. 3B and 3E). This differs from, for example, the conventional desktop computer 100b (FIG. 1B), in which the desktop computer 122 is a component of all subsets of the desktop computer 100b that constitute computing systems. Various examples of this aspect of the present invention will be provided in more detail below.

The ability to form computing systems from disjoint subsets of a component set advantageously enables the components in the component set to contemporaneously perform multiple functions, possibly for multiple users and in multiple locations. Furthermore, each subset of the component set that forms a computing system may be physically smaller than the entire component set, thereby increasing the mobility of the computing system formed by the subset of components.

In another aspect, the present invention features a unique physical modularity. Functional modules are distributed among physical modules (components) so that physical modules may be rearranged into different configurations. Distributing functional modules among physical modules rather than, for example, providing all functional modules within a single physical module allows flexible reconfiguration of components into different computing systems. Such a variety of computing systems derived from a single set of components may be desirable to provide a variety of modes of user interaction. For example, one configuration may be small and well-suited to mobile use, while another configuration may include a large display and therefore be well-suited to desktop publishing or for users with visual impairments.

The ability to derive a variety of computing systems from a single set of interoperable components may decrease the total size, cost, and/or number of components that a particular user or enterprise needs to purchase and maintain in order to obtain the full range of computing systems.

Furthermore, redundancy of data may be reduced or eliminated by the ability of components to easily access data stored in other components. For example, a component having a mass storage module (e.g., a hard disk drive) may be used to store user data such as an address book and calendar. This mass storage module may be accessed by other components in various configurations, thereby eliminating the need to generate and store multiple instances of such data. The component having the mass storage module may be disconnected from the other modules and used separately as a portable computing device that has access to all of the information stored by the mass storage module.

Various configurations of such a re-configurable set of components may present the user with a smaller number of user interfaces than a conventional set of mobile computing devices. For example, one component may include a touch screen that can be used to obtain user input in a variety of different configurations. The touch screen (and associated software) may therefore be used to provide a consistent user interface to the user across a wide variety of applications. This differs from conventional systems, in which the user must typically use one user interface to interact, for example, with a cellular telephone, another user interface to interact with a PDA, etc.

Having described general features and advantages of various embodiments of the present invention, some particular embodiments of the present invention will now be described in more detail.

Figure 4:
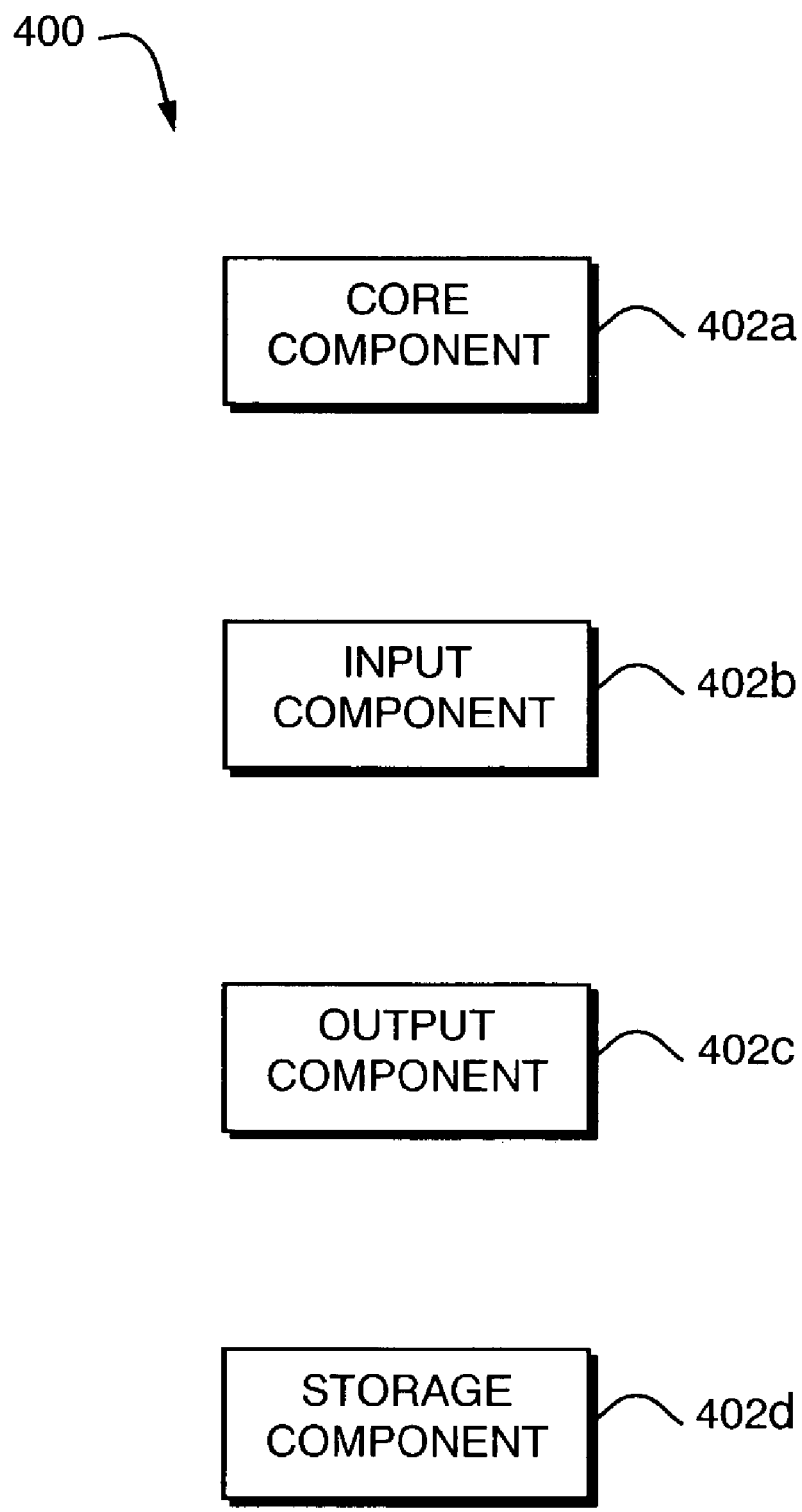
FIG. 4 is a block diagram of a set of components that may be interconnected to form various computing systems according to one embodiment of the present invention.

Referring to FIG. 4, in one embodiment of the present invention a component set 400 is provided that includes a core component 402a, an input component 402b, an output component 402c, and a storage component 402d. As described in more detail below, the components 402a–d may be interconnected in various configurations to form a variety of computing systems. It should be appreciated that the particular components 402a–d shown in FIG. 4 are shown and described herein merely for purposes of example, and do not constitute a limitation of the present invention. In particular, the particular sub-components of each of the components 402a–d shown in FIGS. 5A–5D are provided merely for purposes of example and do not constitute limitations of the present invention. Rather, the components 402a–d may include a greater or lesser number of components than shown in FIGS. 5A–5D.

As described in more detail below, all four of the components 402a–d may be interconnected to form a computing system that performs functions similar to those performed by a conventional laptop computer. The components 402a–d may also be physically disengaged and reconfigured to perform functions similar to those conventionally performed by other devices. For example, the output component 402c (which may, for example, include a display monitor) and the input component 402b (which may, for example, include a mouse and/or keyboard) may be interconnected to form an Internet appliance that may be used to browse the Web and/or send and receive email. The storage component 402d (which may, for example, include a hard disk drive and/or a DVD drive) and the output component 402c may be interconnected to form a home theater system. The storage component 402d and the core component 402a may be interconnected to form a portable media player, such as a portable DVD player. Subsets of the four components 402a–d may be interconnected in various other ways to perform other functions as described in more detail below. In some configurations, two or more subsets of the four components 402a–d may operate independently as separate useful computing systems.

It should be appreciated that the names assigned to the components 402a–d, such as "core component" and "output component" are provided purely for convenience to indicate functions that may be performed by the components in certain embodiments of the present invention, and do not constitute limitations of the present invention. Rather, each of the components 402a–d may perform various functions in different configurations of the component set 400 in various embodiments of the present invention. For example, the output component 402c may perform input functions in certain configurations and the input component 402b may perform output functions in certain configurations.

Figure 5A:
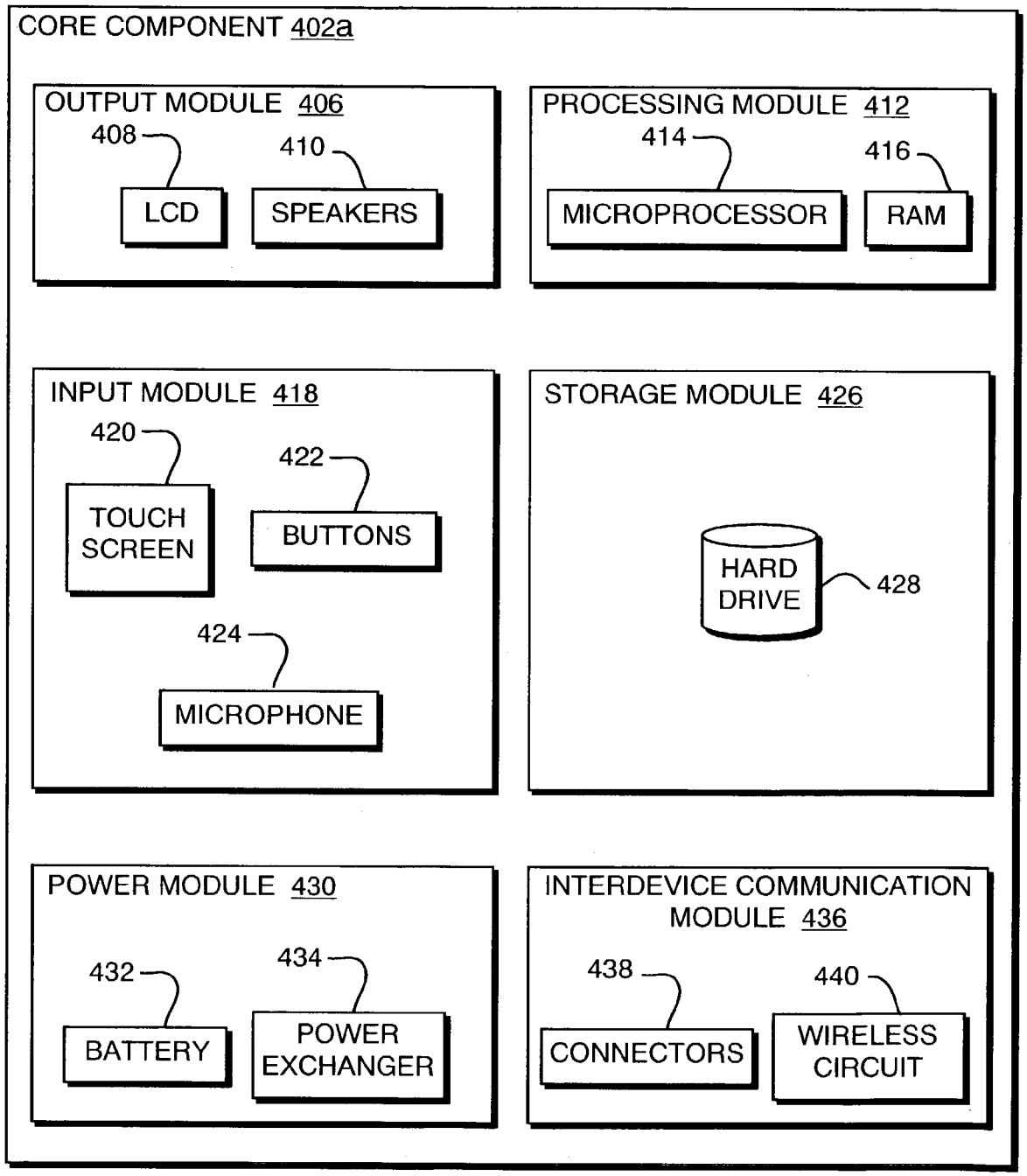
FIGS. 5A–5D are block diagrams of functional modules included in components according to one embodiment of the present invention.

Referring to FIG. 5A, one embodiment of the core component 402a is shown in more detail. The core component 402a includes an output module 406, a processing module 412, an input module 418, a storage module 426, a power module 430, and an interdevice communication module 436. The inclusion of these modules in the core component 402a enables the core component 402a to operate on its own to perform functions similar to those performed by conventional laptop computers and/or PDAs.

Various embodiments of the functional modules implemented by the core component 402a are now described. In one embodiment, the processing module 412 includes a low-power microprocessor 414 such as the Crusoe 0.13 micron TM5800 processor from Transmeta Corporation of Santa Clara, Calif., and RAM 416 on par with those in laptops in terms of capacity and speed. A consumer-oriented operating system is stored in RAM 416 and/or hard disk 428 and processed by microprocessor 414. The processing module 412 may be significantly smaller than those of conventional laptop computers as a result of (1) combining multiple ICs into a commercially available multi-chip module package, (2) utilizing incremental advances in component packaging technologies, and (3) eliminating redundant and otherwise unneeded components.

The input module 418 includes a touch screen 420, buttons 422, and a microphone 424. As should be appreciated from this example, physical devices within the core component 402a may contribute to more than one functional module. For example, in the embodiments of the processing module 412 and the input module 418 just described, the RAM 416 contributes both to the processing module 412 and to the input module 418. Multi-module devices such as the RAM 416 are depicted in the drawings as being part of only one functional module purely for ease of illustration.

One example of the touch screen 420 is the ClearPad™, available from Synaptics Incorporated of San Jose, Calif. The ClearPad™ is 83.70 mm wide by 71.25 mm high. It has an x/y position resolution of greater than 1000 dots per inch. Its power supply voltage is 5.0V±10%, and its power supply current is just a few milliamps, making it suitable for use with portable computing devices. The ClearPad™, however, is merely one example of the touch screen 420 and does not constitute a limitation of the present invention. Rather, touch screens having characteristics which differ from those of the ClearPad™ may be used to implement the touch screen 420.

The output module 406 includes a liquid crystal display (LCD) 408 such as a 5" active-matrix transflective color TFT screen from Samsung, and audio speakers 410. The LCD 408 and the touch screen 420 may be implemented using a single touch screen. For example, in one embodiment of the present invention, both the LCD 408 and the touch screen 420 are implemented using the Synaptics cPad™. Utilizing Synaptics capacitive ClearPad™ touch screen technology, the cPad serves as both a navigation device for cursor control and as a display. The cPad integrates a ClearPad sensor with a 240×160 pixel liquid crystal display, and EL backlighting.

The power module 430 includes a rechargeable battery pack of cells 432 such as the UP295385 Li-polymer battery cell from Sony, and a power exchanging circuit 434 for receiving and distributing power through an external connection. The inter-device communication module 436 includes electrical connectors 438 and a radio frequency (RF) wireless communication circuit 440. Examples of electrical connectors that may be used by the core component 402c and the other components shown in FIG. 4 are described in detail below with respect to FIGS. 7A–7C. The storage module 426 includes a fast and high-capacity (10+ gigabytes) hard disk drive 428. The storage module 426 may also include part or all of the RAM 416.

In one embodiment, the physical weight, physical volume, and user interface of the core component 402a are comparable to those of a conventional handheld computer or personal digital assistant (PDA). The amount of media storage, processing, and battery life included in the core component 402a may be comparable to that of a laptop. In one embodiment, the hard disk drive 428 of the core component 402a provides the primary media storage for most computing systems formed from the component set 400.

In one embodiment, one advantage of the core component 402a is its portability. It may be of a size and weight such that it can comfortably be carried in clothing pockets or handbags. As described above, the core component 402a may itself constitute a computing system having computing power comparable to that of conventional desktop and laptop computers but with increased portability. Similarly, the computing power of the core component 402a may make it a more powerful tool than conventional handheld computers.

A further advantage of the core component 402a is that it may be interconnected with the other components 402b–d in the component set 400 to form a variety of computing systems that share the same data and applications. This contrasts with conventional handheld devices, which, as described above, often include redundant data sets and applications, and which often do not include the same data as the user's desktop or laptop computer. This feature of the component set 400 eliminates the need to edit data down to a "portable" size. It also eliminates the need to synchronize data between computing devices since the components 402a–d in the component set 400 may be interconnected into a variety of computing devices that may satisfy all of the user's computing needs, and because the primary store of data is contained in a highly portable device (the core component 402a).

The inclusion of a wireless circuit 440 in the core component 402a enables the core component 402a to communicate wirelessly with other components 402b–d and with other wireless devices. Use of wireless communication is predicted to increase and to be implemented in a very wide array of appliances, even those not traditionally viewed as computing devices. In one embodiment of the present invention, the portability, computing power, and storage volume of the core component 402a makes it uniquely applicable for use in applications involving wireless communications.

Figure 5B:
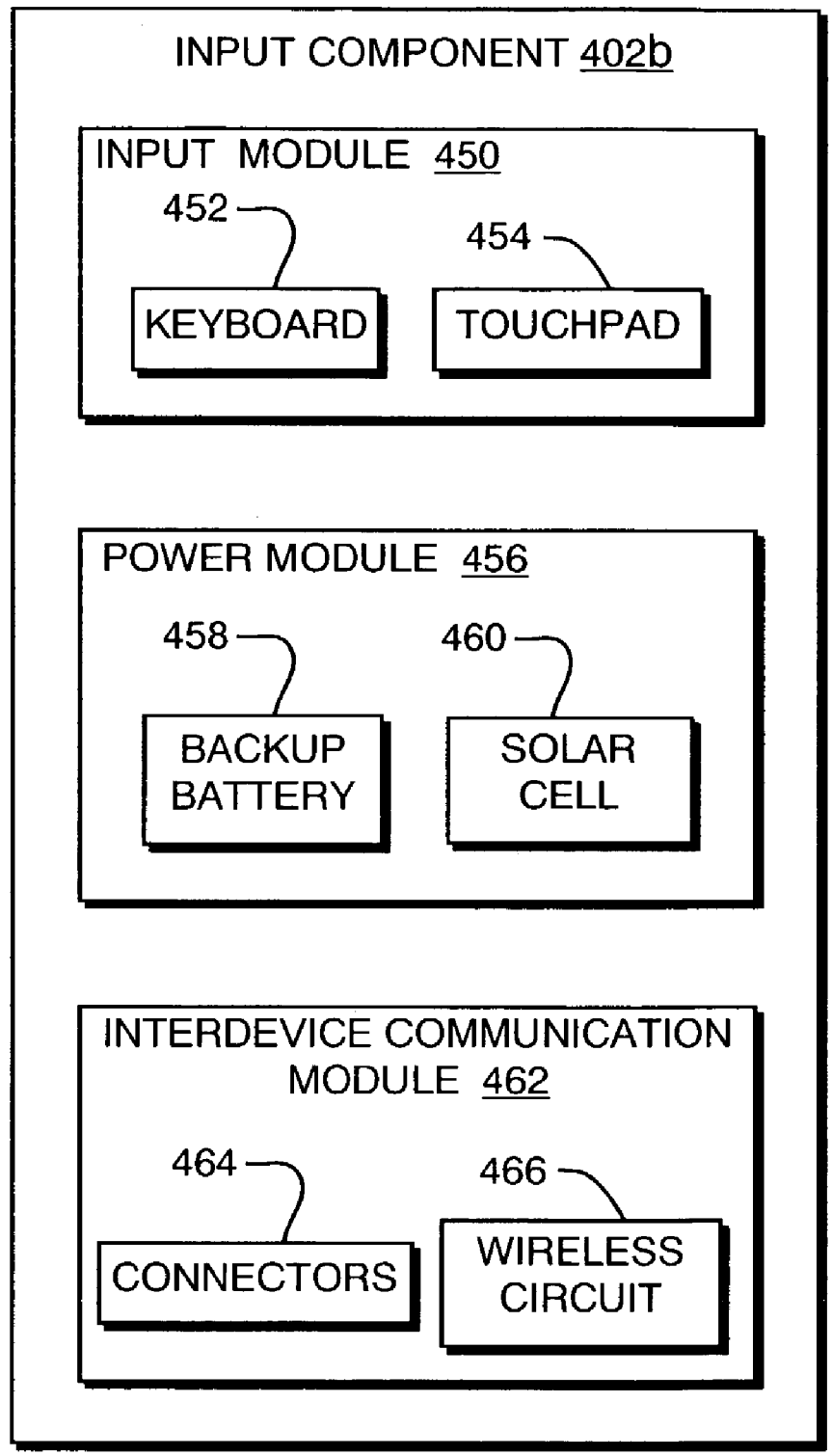

Referring to FIG. 5B, in another embodiment, the input component 402b includes an input module 450, a power module 456, and an interdevice communication module 462. In the depicted embodiment, the input component 402b does not include all of the functional modules required by a computing system and therefore cannot operate in isolation as a computing system. This, however, is not a limitation of the present invention. Rather, the input component 402b may include a greater or lesser number of components than that shown in FIG. 5B and may include all of the functional modules required by a computing system. In the embodiment depicted in FIG. 5B, the input component 402b provides a user input interface when interconnected with some or all of the other components in the component set 400.

The input module 450 includes a conventional computer keyboard 452 with an integrated touchpad cursor pointing device 454, and has an appearance similar to that of a conventional computer keyboard. The interdevice communication module 462 includes electrical connectors 464 and a low power wireless transceiver circuit 466, such as a Bluetooth circuit. In one embodiment, the power requirements of the input component 402b are low, and therefore the power module 456 includes only a solar cell 460 and a small re-chargeable coin cell battery 458.

Figure 5C:
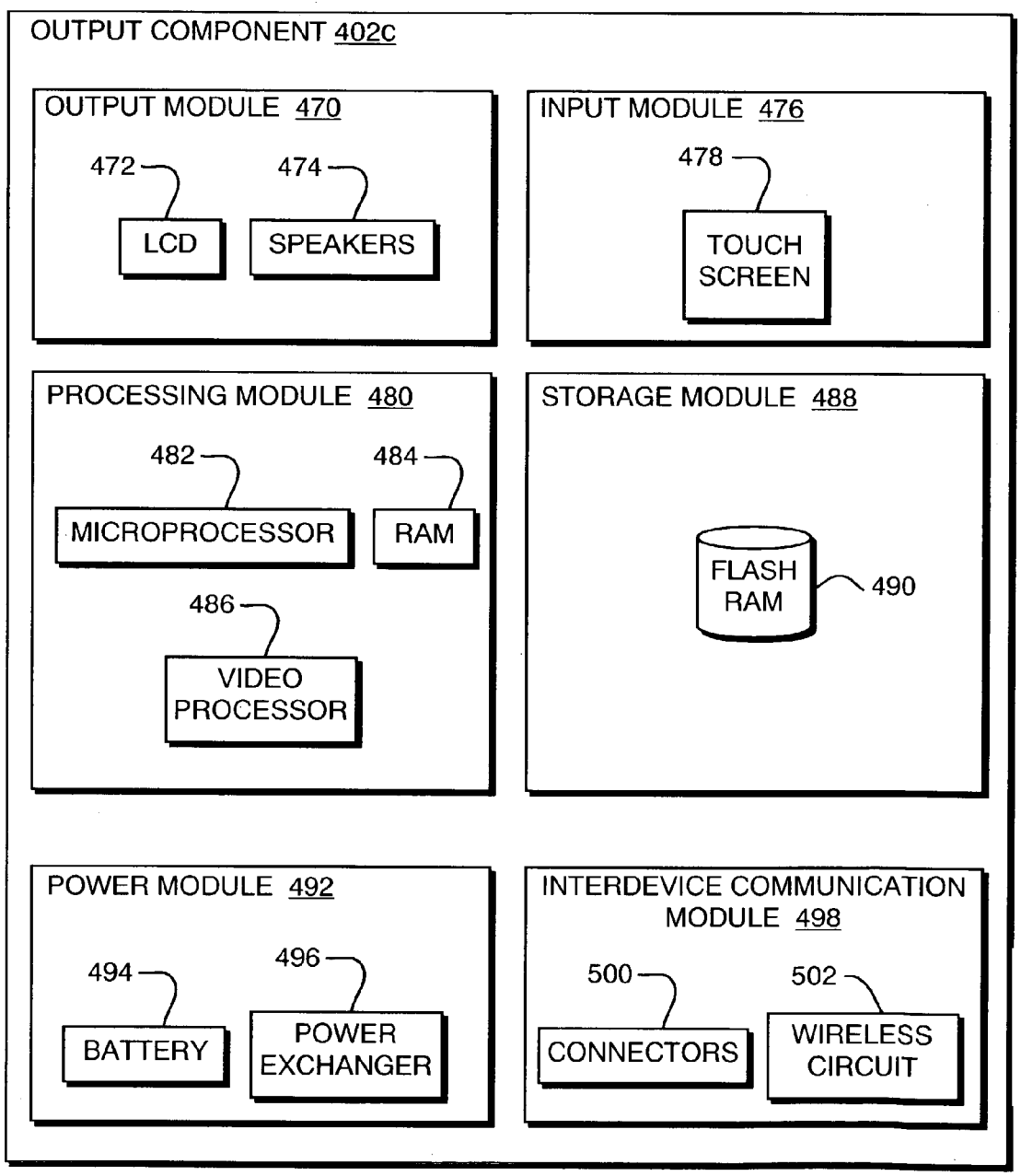

Referring to FIG. 5C, in one embodiment, the output component 402c includes an output module 470, an input module 476, a processing module 480, a storage module 488, a power module 492, and an interdevice communication module 498. It should be appreciated that the embodiment of the output component 402c shown in FIG. 5C includes the essential functional modules of a portable computing system: the input module 476, the output module 470, the power module 492, the processing module 480, and the storage module 488. The embodiment of the output component 402c shown in FIG. 5C may, therefore, operate independently as a computing system. For example, in one embodiment, the output component's limited processing, limited storage, touch screen input, speaker output, and physical appearance perform functions similar to those of a conventional web pad. In various other configurations, as described in more detail below, the output device 402c primarily performs the functions of a conventional display monitor.

The output module 470 may appear physically similar to a conventional LCD desktop monitor. It includes audio speakers 474 and a large LCD display 472, such as a 14.1" color TFT active matrix panel. The input module 476 includes a touch screen 478, such as a resistive or capacitive touch screen, overlaid on the LCD 472. The processing module 480 includes a limited capacity, low power microprocessor 482, such as Dragonball System's Dragonball EZ, a limited amount of system RAM 484, and a low-power video processing chip 486, such as Silicon Motion's Lynx EM+. The storage module 488 includes a limited-size flash RAM 490. The flash RAM 490 has sufficient capacity to store some applications but not enough to provide permanent user data storage. The power module 492 includes a permanent, large capacity battery pack 494 that complements the form factor of the LCD screen 472, such as a multi-cell lithium polymer pack, and a power exchanging circuit 496 for sharing power with external devices. The interdevice communication module 498 includes a wireless transceiver circuit 502, such as a Bluetooth circuit, 80211b circuit, HomeRF circuit, or infra-red transceiver, and additional connectors 500 for transmitting data and for other communication with components 402a–b and 402d.

As an individual device, the output component 402c has the ability to connect through a modem or wirelessly through a base station to the Internet. The user may interact with websites directly using the touch screen 478. The output component 402c may also include additional storage for web page caching to improve performance. The output component 402c may act as a web appliance in that it may appear to the user solely as an interface to the Internet. Storage provided by the output component 402 is primarily abstracted over the Internet or other network. This type of keyless-input internet appliance is often (and hereafter) referred to as a "web pad."

Note that although the particular embodiment of the output component 402c shown in FIG. 5C includes all of the functional modules of a computing system, this is not a requirement of the present invention. Rather, the output component 402c may include fewer than all of the functional modules of a computing system and therefore not be capable of acting on its own as a computing system.

Figure 5D:
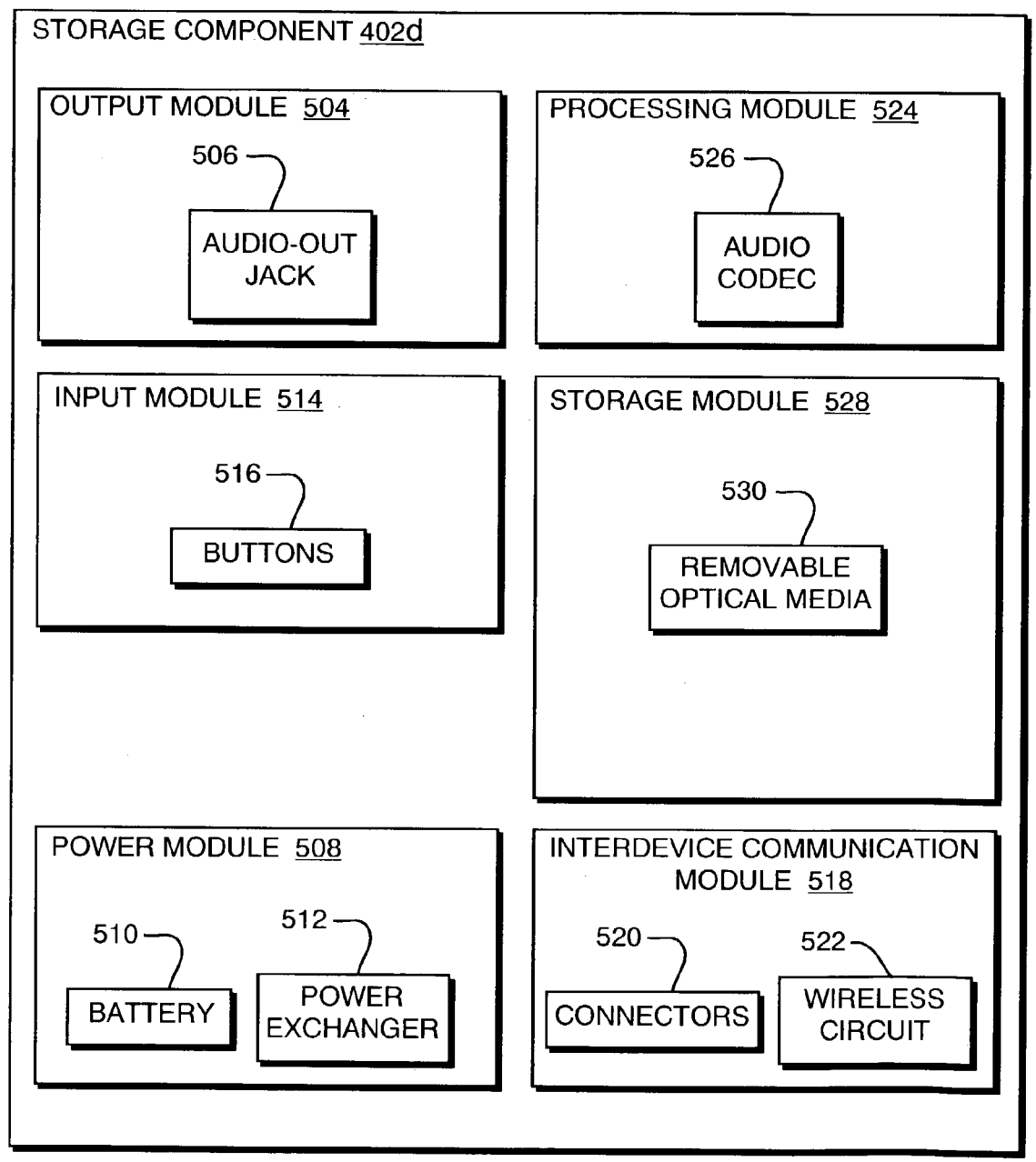

Referring to FIG. 5D, in one embodiment, the storage component 402d includes an input module 514, an output module 504, a processing module 524, a power module 508, a (removable) storage module 528, and an interdevice communication module 518. In one embodiment of the present invention, the storage component 402d primarily performs the functions of a persistent media storage device, such as an optical media reader (e.g., a CD-ROM drive), in most configurations. The storage component 402d may, however, perform a variety of other functions, such as sourcing power to other components from its battery. In one embodiment, the storage component 402d is designed to appear physically similar to a standard portable CD audio player.

The input module 514 includes a standard set of CD player buttons 516, such as play/pause, stop, track forward, and track backward. The output module 504 includes an audio-out jack 506 for connection to standard headphones. The processing module 524 is also essentially identical to the audio circuitry of a portable CD player, including a standard audio codec 526, a headphone amplifier, and minimal RAM for skip buffering. The power module 508 includes a battery 510 of sufficient capacity to minimally play an audio CD, and a power exchanging circuit 512 for sourcing or receiving power from external sources. The interdevice communication module 518 includes a low power wireless communication circuit 522 of sufficient bandwidth to transmit encoded audio information, such as a Bluetooth circuit, as well as standard electrical connections 520 for transmitting power and other information such as video to and from other components. The storage module 528 includes the removable optical media 530 itself, such as a DVD or CD.

In certain configurations the storage component 402d performs functions similar to those performed by an optical drive of a conventional laptop computer, but is physically removable and includes enough additional functional modules that it may operate independently as a computing system. Thus, as a discrete device, it is not dormant or fragile (as is the case with many removable laptop media drives), but is rugged and fully functional as an audio CD playback unit.

As described above, in various embodiments of the present invention components may be rearranged and interconnected to form different computing systems. Various computing systems that may be formed using the components 402a–d in the component set 400 (FIG. 4) will now be described.

It should be noted that, although not expressly described in the following examples, components may share power using their respective power modules in a variety of ways in different configurations, as will be apparent to those of ordinary skill in the art. Furthermore, although not explicitly stated in the following examples, it should be assumed that the components 402a–d may communicate with each other using their respective interdevice communication modules in the various configurations.

The core component 402a may operate independently as a personal digital assistant (PDA) and/or a digital audio player (such as an MP3 player). In particular, when the core component 402a is not connected to any of the other components 402b–d, the core component 402a may operate in a first mode in which the touch screen 420 of the input module 418 (FIG. 5A) both receives input (e.g., from a user's finger) and provides display output. The user may, for example, use his finger to select icons displayed on the touch screen 420 and to interact with other graphical user interface (GUI) controls, such as menus, windows, and buttons. The touch screen 420 may additionally or alternatively be capable of receiving input from a stylus.

Figure 8A:
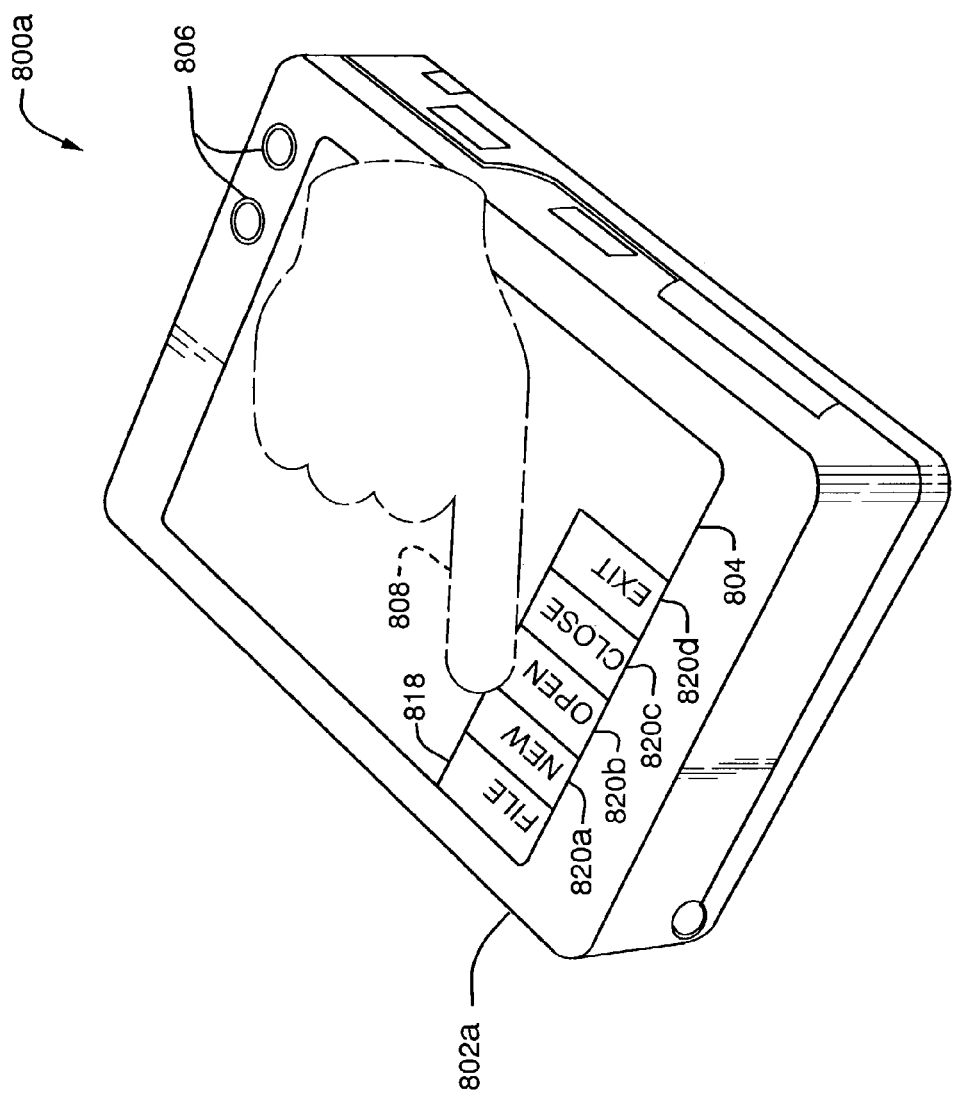
FIG. 8A is a perspective view of a core component having a touch screen and operating in a first mode in which the touch screen both receives input and displays output according to one embodiment of the present invention.

Referring to FIG. 8A, for example, a core component 802a is shown in a first configuration 800a. The core component 802a is an example of the core component 402a (FIG. 5A). In one embodiment, the core component 802a includes: a Crusoe 0.13 micron TM5800 processor from Transmeta Corporation of Santa Clara, Calif.; a notebook computer hard disk drive with 10–20 GB of storage capacity, such as the model MK2003GAH hard disk drive from Toshiba America Electronic Components, Inc. of Irvine, Calif.; 256 MB of RAM, such as 8×256 Mbit DDR SDRAM available from Nanya Technology Corp. of Linkou, Taiwan; a five-inch, high-resolution super-bright VGA color LCD, such as a 5-inch Transflective WVGA TFT LCD (800*480, 64 k color) active-matrix transflective color display from Samsung Electronics, Ltd. of Hong Kong; a ClearPad™ touchscreen from Synaptics Incorporated of San Jose, Calif.; an advanced lithium polymer battery such as the UP295385 Li-polymer battery cell from Sony Electronics, Inc. of Park Ridge, N.J.; input/output ports for IEEE 1394 (FireWire), Universal Serial Bus (USB), audio in/out, and a docking connector; and built-in 802.11 and Bluetooth wireless networking. In one embodiment, the core component 802a is 4.1" (105 mm) wide×2.9" (74 mm) long×0.9" (22 mm) thick and weighs less than 9 ounces (250 grams). Core component 802a includes a touch screen 804, which is an example of touch screen 420, and buttons 806, which are examples of buttons 422.

The core component 802a may operate in a first mode in the configuration 800a shown in FIG. 8A, in which the core component 802a is not connected to any other components. In particular, in the first mode of operation the touch screen 804 may be enabled both to receive input and to display output. For example, a user may move finger 808 across the surface of the touch screen 804 to control movement of an on-screen cursor 822. In the particular example shown in FIG. 8A, movement of finger 808 on the surface of the touch screen 804 causes a corresponding movement of the on-screen cursor 822. The user may thereby interact with graphical user interface (GUI) widgets such as menus, icons, and buttons. In FIG. 8A, for example, the cursor 822, in response to movement of the user's finger 808, is shown as selecting an "Open" menu choice 820b among a plurality of menu choices 820a–d in a "File" menu 818. The touch screen 804 both receives input from the user's finger 808 and displays output, such as the file menu 818. Those of ordinary skill in the art will appreciate how to design and implement software for causing the touch screen 804 to perform these functions.

The core component 402a and the output component 402c may be interconnected to form a PDA with a larger display (output module 470) provided by the output component 402c. In this configuration, the core component 402a may provide the processing module 412, the input module 418, and the storage module 426, while the output component 402c may provide the output module 470.

Alternatively, in this configuration the core component 402a may operate in a second mode in which the touch screen 420 of the input module 418 (FIG. 5A) exhibits the behavior of a trackpad. In particular, the touch screen 420 may continuously track the position of the user's finger 808 on the touch screen's surface. The core component 402a may cause an on-screen pointer, displayed on the LCD 472 of the output component 402c, to move in correspondence with the movement of the user's finger 808 on the surface of the touch screen 420.

Referring to FIG. 8B, for example, the core component 802a is shown in a second configuration 800b in which the core component 802a is coupled to a docking component 802b. The docking component 802b illustrated in FIG. 8B has the form factor of a conventional laptop computer. The docking component 802b includes, for example, an upper component 824a and a lower component 824b joined at a hinge 830. Upper component 824a includes a display screen 828 and lower component 824b includes a keyboard 826. The docking component 802b therefore includes at least some of the features of both the output component 402c (FIG. 5C) and the input component 402b (FIG. 5B). In the embodiment illustrated in FIG. 8B, however, the docking component 802b does not include a processing module (such as the processing module 480 shown in FIG. 5C) or a storage module (such as the storage module 488 shown in FIG. 5C). Rather, these modules are provided by the processing module 412 and the storage module 426 of the core module 802a in the embodiment of FIG. 8B.

The core component 802a is coupled to the docking component 802b within a cavity 834 in the docking component 802b. In the embodiment illustrated in FIG. 8B, the cavity 834 is located underneath the right-hand side of the keyboard 826. Alternatively, the cavity 834 may be located in the docking component 802b at the location where a trackpad is typically located in a conventional laptop computer (i.e., beneath the center of keyboard 826). Once the core component 802a is coupled to the docking component 802b, the touch screen 804 may be enabled for use either as a stylus-based digitizer or as a trackpad. Once the core component 802a is coupled to the docking component 802b, therefore, the configuration 800b presents the user with a physical user interface that closely resembles that provided by a conventional laptop computer.

If the touch screen 804 is enabled for use as a trackpad in the configuration 800b shown in FIG. 8B, a user may move finger 808 across the surface of the touch screen 804 along a trajectory 812 having starting point 810a and end point 810b. The core component 802a may register the input provided thereby, and transmit appropriate output to the display screen 828 in response, thereby causing cursor 832 to move on screen 828 from starting point 814a to end point 814b along a trajectory 816 that corresponds to trajectory 812. Those of ordinary skill in the art will appreciate how to design and implement software for controlling the on-screen cursor 832 in response to movement of the user's finger 808.

Conventional PDA touch screens typically require high-pressure contact. Human fingers are typically not capable of satisfying such pressure requirements while performing detailed pointing operations. As a result, it is typically necessary to use a thin and rigid stylus to provide input to a PDA. The touch screen 420, however, may be implemented using a "soft touch" touch screen, such as the ClearPad™. While typical touchscreens are operated by bending a conductive membrane into physical contact with a conductive surface, which requires pressure, the ClearPad™ sensor is based on capacitance, and requires only the softest touch of the user's finger on the screen's surface. The ClearPad™ is capable of continuously tracking the position of the user's finger on the surface, unlike touch screens typically used in conventional PDAs. The ClearPad™ may therefore be used to enable the touch screen 420 to perform the functions of a trackpad, in addition to enabling "soft touch" input to the core component 402a when it operates as a PDA.

The output functionality of the touch screen 420 may optionally be disabled while the touch screen 420 is in use as a trackpad, because the user may not require or desire any output on the touch screen 804 while the touch screen 804 is in use as a trackpad. For example, as illustrated in FIG. 8B, the touch screen 804 does not display any output in the configuration 800b. The touch screen 804 may, for example, display a solid field of a single color while in use as a trackpad. Alternatively, the touch screen 804 may, for example, enter a low-energy mode in which all output is disabled while the touch screen 804 is in use as a trackpad.

The core component 402a, the output component 402c, and the input component 402b may be interconnected to perform functions similar to a conventional sub-notebook computer. The core component 402a may provide the processing module 412 and the storage module 426. The input component 402b may provide the input module 450, and the output component 402c may provide the output module 470. The touch screen 420 of the core component 402a may also perform the functions of a trackpad, as described above, to provide an additional means of input in this configuration. Such a feature may be particularly useful if, for example, the input module 450 of the input component 402b includes only the keyboard 452 and not the touchpad 454. This configuration therefore enables the user to access the full processing and storage capabilities of the core component 402a using the larger and more full-featured input module 450 of the input component 402b and the output module 470 of output component 402c.

The core component 402a, input component 402b, output component 402c, and storage component 402d may be interconnected to perform functions similar to that of a conventional laptop or desktop computer. The core component 402a may provide the processing module 412, the input component 402b may provide the input module 450, the output component 402c may provide the output module 470, and the storage component 402d may provide the storage module 528. The touch screen 420 of the core component 402a may also perform the functions of a trackpad, as described above, to provide an additional means of input in this configuration. This configuration therefore enables the user to access the maximum processing power and storage capabilities provided by the components 402a–d at once.

The core component 402a and input component 402b may be interconnected to perform functions similar to that of a conventional PDA with a full-size keyboard connected to it. The core component 402a may provide the processing module 412, the output module 406, and the storage module 426, while the input component 402b may provide the input module 450. This configuration therefore enables the user to access the full processing power and storage capabilities of the core component 402a using a full-size keyboard.

The core component 402a and storage component 402d may be interconnected to perform functions similar to that of a portable DVD player. The core component 402a may provide the processing module 412, the output module 406, and the input module 418, while the storage component 402d may provide the storage module 528. This configuration therefore enables the user to play back audio and/or video from a DVD using the portable core component 402a.

The core component 402a, the storage component 402d, and the output component 402c may be interconnected to perform functions similar to that of a home theater system. The core component 402a may provide the processing module 412 and the input module 418, the storage component 402d may provide the storage module 528, and the output component 402c may provide the output module 470. In particular, the touch screen 420 of the core component 402a may perform the functions of a trackpad, as described above, in this configuration. This configuration therefore enables the user to play back audio and/or video from a DVD on the larger display provided by the output component 402c using the portable core component 402a. Using wireless connections the core component 402a may be used as a wireless remote control to control the DVD player.

The core component 402a, the storage component 402d, and the input component 402b may be interconnected to perform functions similar to that of a portable DVD player with a keyboard. The core component 402a may provide the processing module 412 and the output module 406, the storage component 402d may provide the storage module 528, and the input component 402b may provide the input module 450. This configuration therefore enables the user to play back audio and/or video from a DVD using the portable core component 402a. The touch screen 420 of the core component 402a may also perform the functions of a trackpad, as described above, to provide an additional means of input in this configuration.

The input component 402b and the output component 402c may be interconnected to form an Internet appliance that may be used, for example, to browse the web or to send and retrieve email. The input component 402b may provide the input module 450, while the output component 402c may provide the output module 470, the processing module 480, and the media storage module 488. Either the input component 402b or the output component 402c may also include a network module to connect to the Internet. This configuration therefore enables the user to connect to the Internet while the core is in use elsewhere.

The input component 402b, the output component 402c, and the storage component 402d may be interconnected to form a combined Internet appliance and home theater system. The input component 402b may provide the input module 450, the output component 402c may provide the output module 470 and the processing module 480, and the storage component 402d may provide the storage module 528. This configuration therefore enables the user to both connect to the Internet and play audio and video using a small, lightweight, and portable computing system.

The output component 402c may be used by itself as a web pad to connect to the Internet for browsing the web and/or sending and receiving email. The output component's output module 470, input module 476, processing module 480, and storage module 488 form a complete computer system and therefore enable it to operate independently of the other components. This configuration therefore enables the user to connect to the Internet using a small, lightweight, and portable computing system.

The output component 402c and the storage component 402d may be interconnected to form a home theater system. The output component 402c may provide the processing module 480, the input module 476, and the output module 470, while the storage component 402d may provide the storage module 528. This configuration therefore enables the user to play audio and video using a small, lightweight, and portable computing system.

The storage component 402d may be used by itself as a CD audio player, similar in function to conventional CD audio players such as the Sony Discman. The storage component's output module 504, input module 514, processing module 524, and storage module 528 form a complete computer system and therefore enable it to operate independently of the other components. This configuration therefore provides the user with a highly portable CD audio player.

It should be appreciated that some combinations of configurations of component set 400 may operate contemporaneously. For example, the core component 402a may be used by itself at the same time as the input component 402b and the output component 402c are interconnected to each other to operate as an Internet appliance. Various other combinations of configurations that have this property should be apparent from the description above. The ability of multiple configurations of the component set 400 to operate contemporaneously increases the functionality of the component set 400 and diminishes the extent to which any one of the components 402a–d is "dead" while other components are operating.

Furthermore, more than two configurations may operate contemporaneously as computing systems. For example, the core component 402a may operate independently as a PDA, the output component 402c may operate independently as a web pad, and the storage component 402d may operate independently as a CD audio player, for a total of three contemporaneously-operating configurations. Similarly, the core component 402a and the input component 402b may be interconnected to form a PDA with keyboard, the output component 402c may operate independently as a web pad, and the storage component 402d may operate independently as a CD audio player. As another example, the core component 402a may operate independently as a PDA, the input component 402b and the output component 402c may be interconnected to form an Internet appliance, and the storage component 402 may operate independently as a CD audio player. These configurations are provided merely for purposes of example and do not constitute limitations of the present invention.

It should also be appreciated that the component set 400 may include multiple ones of one or more of the components 402a–d. For example, the component set 400 may include multiple core components 402a, multiple input components 402b, multiple output components 402c, and/or multiple storage components 402d. Inclusion of such additional components further increases the number of configurations of the component set 400, and increases the number of configurations of the component set 400 that may be operated contemporaneously as computing systems. For example, inclusion of a second core component 402a enables the contemporaneous use of one core component 402a interconnected with the input component 402b as a PDA with keyboard, and another core component 402a interconnected with the output component 402c as a PDA with a large display.

One advantage of the physical modularity in conjunction with the redundant functional modularity described above is that in combination they enable the component set to be flexibly formed into configurations having different features that efficiently satisfy the needs of a particular user at a particular time. For example, a user who does not require a large screen may use the core component 402a—with its small screen—by itself, thereby obtaining a mobile computing system that satisfies the user's unique combination of needs. If the user subsequently requires a larger display, the user may connect the core component 402a to the output component 402c. The size of various configurations of embodiments of the present invention may be smaller than conventional systems that perform the same functions because of the separation of functional modules into different physical modules. Furthermore, because components in a component set are able to communicate with each other according to various embodiments of the present invention, separation of functional modules into different physical modules need not result in lack of interoperability between components.

One advantage of the particular set of components described above with respect to FIGS. 5A–5D is that various configurations of the components correspond to well-established and familiar paradigms for computing systems. For example, in the configuration 800a illustrated in FIG. 8A the core component 802a operating by itself presents the user with an interface and functionality that are similar to that of a conventional handheld computer or PDA, which are established paradigms that are familiar to many users. Similarly, in one embodiment the configuration including all of the components 402a–d presents the user with an interface and functionality that are similar to that of the familiar laptop computer. When the components 402a–d are physically disengaged (although still in wireless communication), they present the user with an interface and functionality that is similar to that of a conventional desktop computer. Various other examples should be apparent from the description above. As a result of the ability of the components 402a–d to emulate various conventional computing systems in various configurations, ease of use is not sacrificed to ease of reconfiguration.

Figure 9:
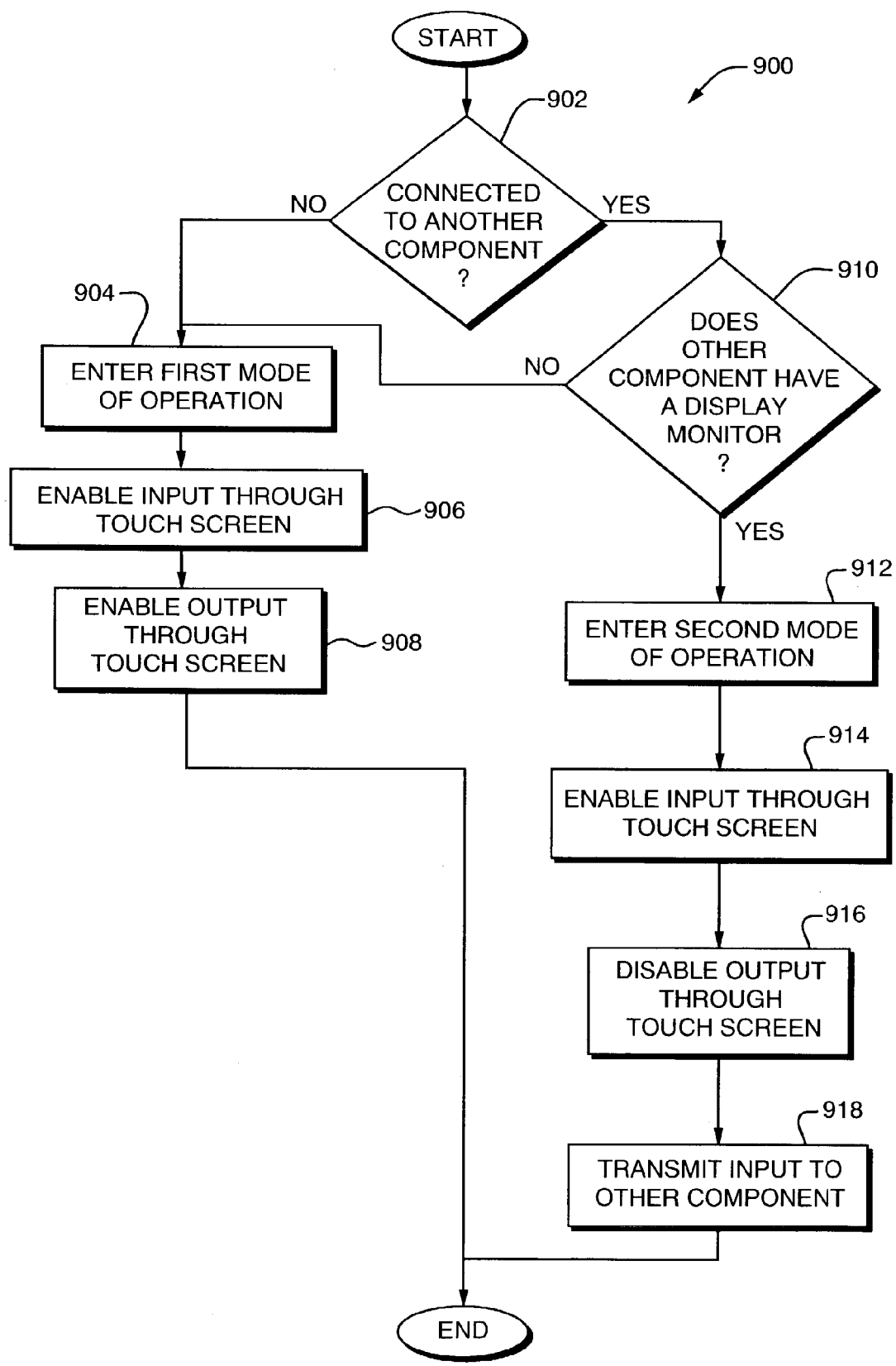
FIG. 9 is a flow chart of a method that is performed by a core component to select and operate in a first mode of operation according to one embodiment of the present invention.

As described above, the core component 402a may operate in one of at least two modes: a first mode in which the touch screen 420 both accepts input and provides output for the core component 402a, and a second mode in which the touch screen 420 receives input that may be provided to another one of the components 402b–d. Referring to FIG. 9, a flow chart is shown of a method 900 that may be performed by the core component 402a to select and operate in one of the first and second modes of operation. It should be appreciated that the method 900 is shown merely for purposes of example and does not constitute a limitation of the present invention. Rather, the core component 402a may use other techniques to select modes of operation. Furthermore, the core component 402a may additionally or alternatively include means (such as a button or switch) for allowing the user to manually select one of the first and second modes of operation. Furthermore, the particular first and second modes of operation described herein are provided merely for purposes of example and do not constitute limitations of the present invention.

Referring to FIG. 9, the method 900 determines whether the core component 402a is connected to another component (step 902). If the core component 402a is connected to another component, the core component 402a enters a first mode of operation (step 904), in which input through the touch screen 420 is enabled (step 906) and in which output through the touch screen 420 is enabled (step 908). In the first mode, therefore, the core component 402a may provide functionality similar to that of a conventional PDA.

If the core component 402a is connected to another component, the method 900 determines whether the other component includes a display monitor (step 910). If the other component does not include a display monitor, the core component 402a enters the first mode of operation as described above with respect to step 904.

If the core component 402a is connected to another component (such as the output component 402c) that includes a display monitor (such as the LCD 472), the core component 402a enters a second mode of operation (step 912). The core component 402a enables input through the touch screen 420 (step 914), disables output through the touch screen 420 (step 916), and transmits input received from the touch screen 420 to the other component (step 918). In the second mode, therefore, the core component 402a may provide functionality similar to that of a conventional trackpad.

In general, enabling the touch screen 420 to be used as a trackpad provides the advantages of conventional trackpads. One advantage of trackpads generally, for example, is that they may be integrated into a computing device (such as the core component 402a) in a relatively small space and without increasing the volume of the device. This provides an advantage over external input devices such as mice, the operation of which requires desktop space in addition to that occupied by the computing device to which it is connected. Furthermore, trackpads are less prone to wear than mice, and users may find trackpads easier to operate than mice and other kinds of pointing devices.

Use of the core component 402 as a trackpad may reduce the total number of input devices that need to be included in the components 402a–d of the system 400. For example, the touch screen 420 of the core component 402a may provide trackpad input to the output component 402c when the core component 402a is connected to the output component 402c. This may eliminate the need to include the touch screen 478 in the output component 402c, since the trackpad functionality of the touch screen 420 may satisfy the input requirements that would otherwise be satisfied by the touch screen. As a result, the output component 402c may be manufactured more easily and inexpensively.

Even if the touch screen 420 is used as a trackpad in addition to rather than instead of other input devices, the ability to use the touch screen 420 as a trackpad increases the flexibility of the core component 402a as a device for providing input to the other components 402b–d. More generally, the ability of the touch screen 420 to be used as a trackpad increases the input options available to the user in each of the configurations in which it is available. For example, when the core component 402a is connected to the output component 402c, the user may provide input using the touch screen 478 of the output component 402c in the same manner as a conventional touch screen. The ability to use the touch screen 420 of the core component 402a as a trackpad in such a configuration provides the user with an additional input option, which the user may use either instead of or in addition to the input capabilities provided by the touch screen 478. This both allows users who have a preference for one kind of input—touch screen or trackpad—over the other to use their preferred mode of input, and allows users to use the mode of input that may be most convenient or appropriate at a particular time. A user may, for example, choose to use the touch screen 478 as a touch screen to select icons on the LCD 472, while using the touch screen 420 as a trackpad to draw shapes or select blocks of text.

The ability to use the touch screen 420 as a trackpad may provide this additional flexibility without any increase in size. The cPad™, for example, is no larger than conventional touch screens. Furthermore, the ability to use the touch screen 420 as a trackpad provides the additional functionality of a trackpad without requiring the use of a physically distinct trackpad or mouse component. Trackpad functionality is thereby added to various configurations of the system 400 without increasing the overall size or power requirements of the system 400, the number of interconnections between the components 402a–d of the system 400, or the complexity of the system 400 from the point of view of the user.

In various embodiments of the present invention, the use of the touch screen 420 as a trackpad does not require the use of a stylus, unlike conventional PDA touch screens. Rather, in various embodiments of the present invention, the user may use a finger to operate the touch screen 420 as a trackpad. This provides a benefit over stylus-based touch screens, because the stylus represents an additional component that must be stored and transported, and which may be misplaced or lost. The ability to operate the touch screen 420 as an input device without a stylus is particularly useful in configurations in which the touch screen 420 is used in conjunction with other input devices, such as the keyboard 352 of the input component 402b. In such a configuration, the user may easily switch back and forth between providing input through the keyboard 352 and the touch screen 420. If the touch screen 420 required a stylus to provide input, switching between the touch screen 420 and keyboard 352 would require the user to repeatedly take hold of and release the stylus, thereby increasing the number of movements required and increasing the opportunity for the stylus to be misplaced.

Although the use of a finger to provide input to the touch screen 420 may be beneficial in certain embodiments of the present invention, the present invention is not limited to such embodiments. Rather, the techniques disclosed herein may be implemented, for example, using touch screens that are capable of receiving input from a finger, stylus, or a combination thereof.

Furthermore, the core component 402a may have a form factor that is particularly well-suited to provide trackpad functionality. For example, as described above, the core component 402a may have a form factor that is similar to that of a conventional PDA. For example, as described above, in one embodiment the core component 402a is 4.1" (105 mm) wide×2.9" (74 mm) long×0.9" (22 mm) thick and weighs less than 9 ounces (250 grams). As a result, the touch screen 420 of the core component 402a may not only be technically capable of acting as a trackpad, but also be ergonomically suitable for use as a trackpad.

In addition, the touch screen 420 may be enabled for use as a trackpad without the addition of any hardware to the core component 402a. When the touch screen 420 is implemented using the ClearPad™ touch screen, for example, the core component 402a already includes the hardware necessary to receive and process input from through the touch screen 420. Furthermore, if the components 402a–d of the system 400 already include sufficient hardware to communicate with each other in the ways described herein, such hardware is also sufficient to communicate trackpad-based input received through the touch screen 420 to other components 402b–d. The implementation of software to enable the touch screen 420 to operate as a trackpad is within the ability of those of ordinary skill in the art.

Component interface 304 and connectors 302a–b were shown and described generally above with respect to FIGS. 3A–3D. Various embodiments of the component interface 304 and connectors 302a–b are now described in more detail. Also described in more detail are embodiments of various techniques that may be used to select functional modules for use in different configurations of a component set.

As described generally above, a particular component may partially or entirely implement one or more functional modules. For example, referring again to FIG. 5A, the core component 402a implements an output module 406 and a processing module 412, among other modules. In a particular configuration of the component set 400, output may (for example) be provided using the core component's output module 406. The information to be output (e.g., a graphic image) may originate from within the core component 402a (such as from the core component's storage module 426) or from another component in the configuration.

More generally, when components are interconnected in a particular configuration, the set of functional modules (and their sub-components) provided by the interconnected components are said herein to form a resource pool. The computing system represented by the configuration may use one or more functional modules of each class in the resource pool to perform the corresponding function. For example, if two components in a configuration (such as the core component 402a and the input component 402b) both include an input module, then the configuration's resource pool includes both input modules. The computing system represented by the configuration may select either or both of the input modules (or sub-components or combinations thereof) to receive input for the computing system.

In other words, when components are interconnected in a particular configuration to form a computing system, the functional modules (and sub-components thereof) provided by such components become available for use by the computing system as a whole. For example, when a configuration includes a component having a keyboard, the keyboard may be used to provide input to one or more of the components in the computing system. It should be appreciated that physical sub-components from multiple components may be combined to form a single functional module in the resource pool available for use by the computing system. It should further be appreciated that in any particular configuration, any particular functional module may be available for use by all components in the configuration or only a subset of components in the configuration. For example, the storage component's processing module 526 may only be available to perform processing tasks for the storage component 402d and not for other components. The ability of a functional module implemented by a particular component to become available for use by other components may be limited in particular embodiments by constraints of hardware design, software, or other factors. The resource pool for a particular configuration may therefore include fewer than all of the functional modules in the configuration; alternatively, there may be multiple resource pools representing functional modules available for use by various components in the configuration.

It has now been described generally that components that are interconnected to form a particular computing system may provide functional modules for use by the computing system as a whole, and that the computing system may choose which functional modules for use to perform particular functions. Embodiments of various techniques for making such choices are now described in more detail.

In one embodiment of the present invention, a "feature list" is associated with each component. The feature list for a particular component includes information descriptive of the features provided by the corresponding component. The feature list may, for example, include information about which functional modules are partially or entirely implemented by the component. A feature list may also include other information about a component. A feature list may, for example, provide information about features of a component including, but not limited to:

- the type (e.g., manufacturer, model name, and model number) of processor(s) contained within the component and characteristics of such processors, such as their clock speed;
- the type(s) of network interface cards or other networking devices contained within a component, and characteristics of such devices, such as their speed;
- the input capabilities of the component, such as whether it includes a keyboard, mouse, touch screen, or other input device;
- the output capabilities of the component, such as whether it includes a display or printer and, if so, the component's output spatial resolution, size, and color resolution;
- the storage capabilities of the component, such as whether it includes a hard disk drive, RAM, or other storage device, and the storage capacity of such storage device; and
- the power capabilities and requirements of the component, such as whether it provides its own power or requires an external power source (and, if so, how much power it requires to operate), and whether it may be used to provide power to other components.

The feature list may also include additional information about each feature, such as whether the feature may be accessed by other components and, if so, how the feature may be accessed by other components. If, for example, a component includes a storage module, the component's feature list may indicate whether other components may access the storage module and, if so, on which port of the component the storage module of the component may be accessed.

It should be appreciated that the feature list information described in the list above is provided merely for purposes of example and does not constitute a limitation of the present invention. Rather, the feature list associated with a component may include any information about the component. Furthermore, the feature list may be stored and represented using any data structure and in any data format, as may be convenient. The kind and amount of information contained in the feature list may vary from component to component. The feature list for a particular component may be generated at any time and in any manner. For example, the feature list may be generated by the manufacturer of the component at the time of manufacture or by a system administrator upon initial installation and/or configuration of the component. The feature list for a component may be stored on a computer-readable medium within the component itself, such as on a ROM. Furthermore, it should be appreciated that the use of feature lists is provided merely for purposes of example and is not a requirement of the present invention.

Figure 6:
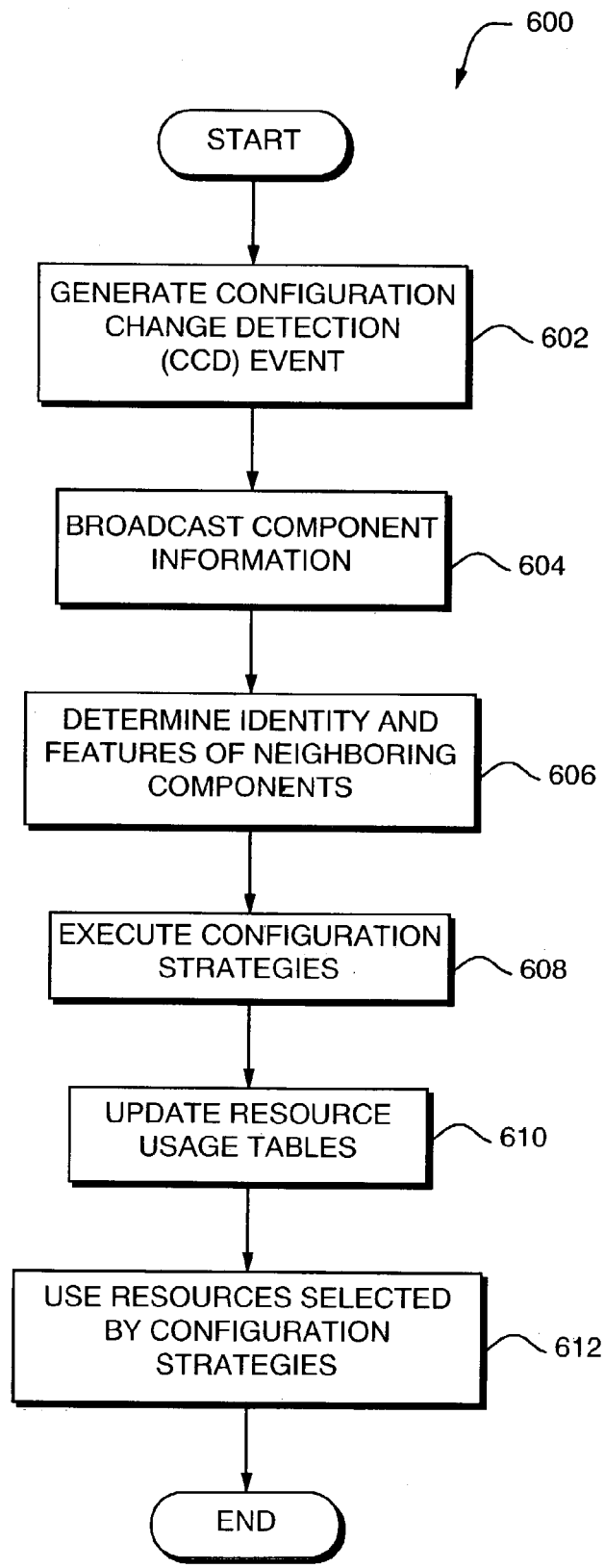
FIG. 6 is a flow chart of a process that is performed when a new component is added to a component set according to one embodiment of the present invention.

In one embodiment of the present invention, a component may examine its own feature list to ascertain which features are provided by the component, and the component may ascertain which features are provided by other components in a component set using the feature lists of the other components. Consider, for purposes of example, an existing interconnected component set including one or more components. Referring to FIG. 6, a flow chart is shown of a process 600 that may be performed by one or more components in a component set when a new component is added to the component set, according to one embodiment of the present invention. When a new component is connected to any of the components in the existing component set, a configuration change detection (CCD) event is generated (step 602). The CCD event indicates that there has been a change in the component set. The CCD event may, for example, be generated by the new component, by the existing components, or by a combination of both. The event may, for example, take the form of a special signal that is transmitted on a bus that is common to the new component and the existing components. As a result, the CCD event is received by one or more of the components.

When a component receives a CCD event, the component may transmit information about itself to other components in the component set. Such information may include, for example, a device identifier (device ID) and part or all of the component's feature list. The device ID may be a unique identifier (such as a numeric or alphanumeric identifier), such as a serial number. The transmission of component information in response to a CCD event may occur in any of a variety of ways. For example, in one embodiment of the present invention, when the new component described above is connected to the existing component set, the new component and the existing components broadcast their device IDs and feature lists so that such information may be received by all of the components (step 604). The components may take turns transmitting such information in any appropriate order.

Some or all of the information transmitted by the components (e.g., device IDs and feature lists) may be stored to maintain a record of current component set's resource pool. Such information may be stored in any of a variety of ways. For example, one or more of the components may store information about itself, its neighbors, non-neighboring components in the component set, or any combination thereof. A single component (such as the core device) may be selected for storing information about components in the component set.

For example, when the new component is added to the existing component set, a CCD event may be generated (e.g., by the new component). In response to the CCD event, each of the existing components may broadcast or otherwise transmit its device ID and/or feature list. Any number of the components may receive this information and process it in any of a variety of ways, as described in more detail below. For example, the new component may store some or all of the information it receives to establish and maintain a record of the features of other components (such as neighboring components) in the component set to which it has been connected.

In one embodiment of the present invention, any two components that are directly coupled to each other by means of a physical or wireless connection between the two components are referred to herein as "neighboring" components. Such components are "directly" coupled to each other in the sense that there is no other component coupled between the two neighboring components. For example, two neighboring components may be connected to each other by means of a video cable, audio cable, serial cable, parallel cable, or wireless connection. It should be appreciated that non-neighboring components may still communicate with each other indirectly using, for example, a common component that neighbors each, or through a bus, even though no immediate physical or wireless connection exists between the non-neighboring components. A component in a component set may have any number of neighboring components.

In one embodiment of the present invention, when a new component is added to an existing component set, the new component determines which components are its neighbors.

For example, upon being connected to the component set, the new component may transmit a neighbor handshaking signal along a channel (e.g., a wire) that is reserved for communication with neighbors of the component. If the new component has a neighboring component, the neighboring component receives the neighbor handshaking signal and transmits a neighbor acknowledgement signal along the same or another channel back to the new component. Receipt of the neighbor acknowledgement signal by the new component indicates to the new component that it has a neighbor. The neighboring component may also transmit additional information to the new component, such as its device ID and feature list, so that the new component may obtain and/or store additional information about its neighbors.

Although the description above states that the new component determines which components are its neighbors when the new component is added to a component set, it should be appreciated that some or all of the existing components may similarly update knowledge of their neighbors in response to a CCD event (step 606). It should be appreciated that components may ascertain the existence and/or identity of their neighbors using techniques other than the particular examples described above.

The description above describes generally how components in a component set may obtain information about each other, such as their device IDS, feature lists, and neighbor information. This information may be obtained, for example, whenever a component is connected to an existing component set. Such information may also be obtained at other times. For example, a component may update its knowledge of other components when it is rebooted. Alternatively, one or more components in a component set may periodically refresh their knowledge of other components in the same component set to ensure that such knowledge is not stale.

As described generally above, components in a component set may provide resources that may be used by other components in the component set. Various techniques for selecting resources (e.g., functional modules) for use in a particular configuration are now described in more detail.

As described above, in one embodiment of the present invention, a feature list is associated with each component. The feature list contains information about the resources provided by the component. These resources are referred to herein as the component's "internal resources," because they are physically located within the component. The component may also make use of resources provided by other components, which are referred to herein as "external resources." It should be appreciated that a particular resource is an "internal" resource with respect to the component within which the resource is physically contained and an "external" resource with respect to all other components.

In one embodiment of the present invention, a "resource usage table" is associated with each component in a component set. The resource usage table identifies, at a particular point in time, which resources the component is using to perform particular functions. The resource usage table includes one or more fields, each of which corresponds to a particular kind of resource (such as power, video input, audio output, etc.). Consider, for example, the core component 402*a*. The resource usage table for the core component may include a field for power. This field identifies the power resource that is currently being used by the core component as, for example, a battery. The field may, for example, store the device ID of a component containing energy. The device ID may be the device ID of the core component itself or of another component in the same component set as the core component. In other words, the core component may use its own (internal) battery or the (external) battery of another component. The resource usage table may contain similar fields for a variety of other resources, such as processing, network, input, output, and storage.

Although the resource usage table is described above as storing the device ID of a component providing a particular resource, it should be appreciated that resources in the resource usage table may be identified in any of a variety of ways. For example, a default value (e.g., 0 or −1) may be used to indicate that a particular resource is being provided internally by the component itself. In another embodiment, a resource may be identified by specifying a physical or logical channel (such as a communications port or pin in a connector) through which the resource may be accessed, instead of or in addition to specifying the device ID of a component providing the resource. Furthermore, information about the location of a resource in addition to its associated device ID may be stored in the resource usage table. For example, characteristics of a resource (such as the amount of RAM) may be stored in the resource usage table.

It should be appreciated that the resource usage table may be stored and represented in any of a variety of forms. In particular, it is not limited to being represented as a "table." Rather, the functions performed by the resource usage tables described herein may be implemented in any manner, such as by using any appropriate data structure. In one embodiment of the present invention, each component stores its own resource usage table, such as in a data structure in RAM. A component may, however, store the resource usage tables of other components in the same component set. A global data structure including resource usage tables of all components in a component set may also be maintained. For example, the core device may maintain such a global data structure. Furthermore, although the resource usage tables described above are dynamic, resource usage tables may be static and created, for example, at the time of manufacture. For example, the resources to be used by a particular component may be pre-determined at the time of the components manufacture, and be non-modifiable. Such pre-determined resource selections may be implemented without the use of any tables at all. Combinations of these techniques may also be employed, as may be convenient for particular applications.

It should be appreciated, therefore, that resource usage tables associated with components in a component set may be used to identify the resources that are being used by each of the components at any particular point in time.

Various techniques for selecting which resources (e.g., functional modules) are to be used by components in a component set are now described in more detail. In one embodiment of the present invention, each component in a component set has a configuration strategy that specifies how to choose which resources the component is to use to perform particular functions. The configuration strategy for a particular component includes a decision procedure for each of one or more classes of resources. The decision procedure for a particular class of resource specifies how a particular resource is to be chosen for use by the component from among a set of available resources of that class. Resource classes include, for example, main memory (RAM), processing, network, input, output, storage, and power.

For example, a simple configuration strategy for the core component 402*a* might include a power decision procedure which specifies that the core component is to use the largest power resource in the current resource pool. The same configuration strategy may, for example, include an input decision procedure which specifies that the core component is to prefer a full-size keyboard over a touch screen, and a touch screen over a keypad as an input device. The configuration strategy for a particular component need not include decision procedures for all classes of resources.

Decision procedures may take any of a variety of forms. For example, in one embodiment, a decision procedure is simply an ordered list of resources of a particular class. The order of the list corresponds to the order in which the resources are preferred for use by the corresponding component. The resources in the list may, for example, be identified by manufacturer, model number, serial number, device ID, or any combination thereof. The resources in the list may also be identified by characteristics that are relevant to the resource class. For example, a list specifying display monitors may list combinations of resolution and number of available colors in decreasing order of preference.

A decision procedure may also be represented as a rule or heuristic for selecting a particular resource from a set of available resources. More generally, a decision procedure may be implemented in software as any procedure that may be executed to select a particular resource from a set of available resources.

The decision procedure for a particular resource class of a particular component may be executed at any time to select a particular resource of that class for use with the particular component. The resource usage table associated with the component may then be updated to reflect that the component is using the selected resource. From that point onward, the component will use the selected resource to perform its intended function.

For example, as described above, the resource usage table of a component may be updated when the component is connected to an existing component set. Referring again to FIG. 6, in one embodiment of the present invention, after a new component is added to a component set, one or more of the components in the component set execute their configuration strategies (e.g., by executing each of the decision procedures in the configuration strategies) to select resources for use by the components (step 608). The resource usage tables associated with the components are then updated to reflect the resources being used by the components (step 610). The components then use the resources selected by their respective configuration strategies (step 612).

The configuration strategy for a particular component may be stored internally within the component. For example, the configuration strategy for a particular component may be generated by the manufacturer of the component at the time of manufacture or by a system administrator upon initial installation and/or configuration of the component. The configuration strategy for a component may be stored on a computer-readable medium within the component itself, such as on a ROM.

In the examples described above, each component has its own configuration strategy. In other embodiments, however, a single configuration strategy may span multiple components. For example, a particular configuration may have a single global configuration strategy. For example, the configuration may have a global configuration strategy that specifies that the configuration prefers to use a full-size keyboard rather than a touch-screen for input. The decision procedures of the global configuration strategy may be executed by, for example, a predetermined component of the configuration, such as the core component 402*a*. The predetermined component may then update a global resource usage table or the individual component resource usage tables as appropriate to reflect the resources chosen by the global configuration strategy.

As described above, a particular component may be capable of selecting either an internal resource or an external resource of the same class to perform a particular function.

For example, the core component 402*a* may include an internal video source that is capable of providing a video signal to the core component's internal display. The core device may, however, also be capable of using an (external) video source provided by another component to provide a video signal to the core component's internal display. As described above, the resource usage table associated with the core component will indicate which video source is being used by the core component at any particular point in time. Some resource selections may occur by default; for example, a resource selection may be made automatically as a result of the mere act of connecting together two components of appropriate types.

In one embodiment of the present invention, the ability of a component to select between an internal resource and an external resource for use to perform a particular function is provided by use of a multiplexor that enables one of either the internal resource or the external resource to be selected for use by the component. For example, referring again to FIG. 5C, the output component 402*c* includes internal LCD 472 and internal microprocessor 482 that may act as a video source for the LCD 472. Assume for purposes of example that the internal microprocessor 414 of the core component 402*a* is more powerful than the output component's microprocessor 482 and is capable of providing a higher-quality source of video to the output component's LCD 472. A multiplexor within the output component 402*c* may be connected to the output of both the output component's internal microprocessor 482 and the core component's microprocessor 414. The output component's internal microprocessor 482 or other controller may, for example, control the multiplexor to select either of the two microprocessors as a video source for the output component 402*c*. The multiplexor may be controlled to select the desired video source at or around the time that the output component's configuration strategy is executed and the output component's resource usage table is updated, as described above with respect to FIG. 6.

Although in the example described above a multiplexor is used to select a video source, it should be appreciated that similar techniques may be used to select any of a variety of resources for use by a component. Furthermore, multiplexors that are capable of selecting from among more than two resources may also be used. In addition, it should be appreciated that devices other than multiplexors may be used to select from among multiple resources.

It should be appreciated that although various automated techniques are described above for selecting resources to be used by the components 402*a–d* in various configurations, such selections may be made by a user of the components 402*a–d*, in whole or in part. For example, the user may select which resources are to be used by various components using a graphical user interface that allows the user to make such selection. Some resources may be selected automatically while others are selected by the user.

It has been generally described that components may be interconnected with each other in various ways, and that interconnected components may communicate with each other (such as by exchanging feature lists) and share resources. Examples of particular techniques for interconnecting components to perform the functions described generally above are now described in more detail.

Figure 7A:
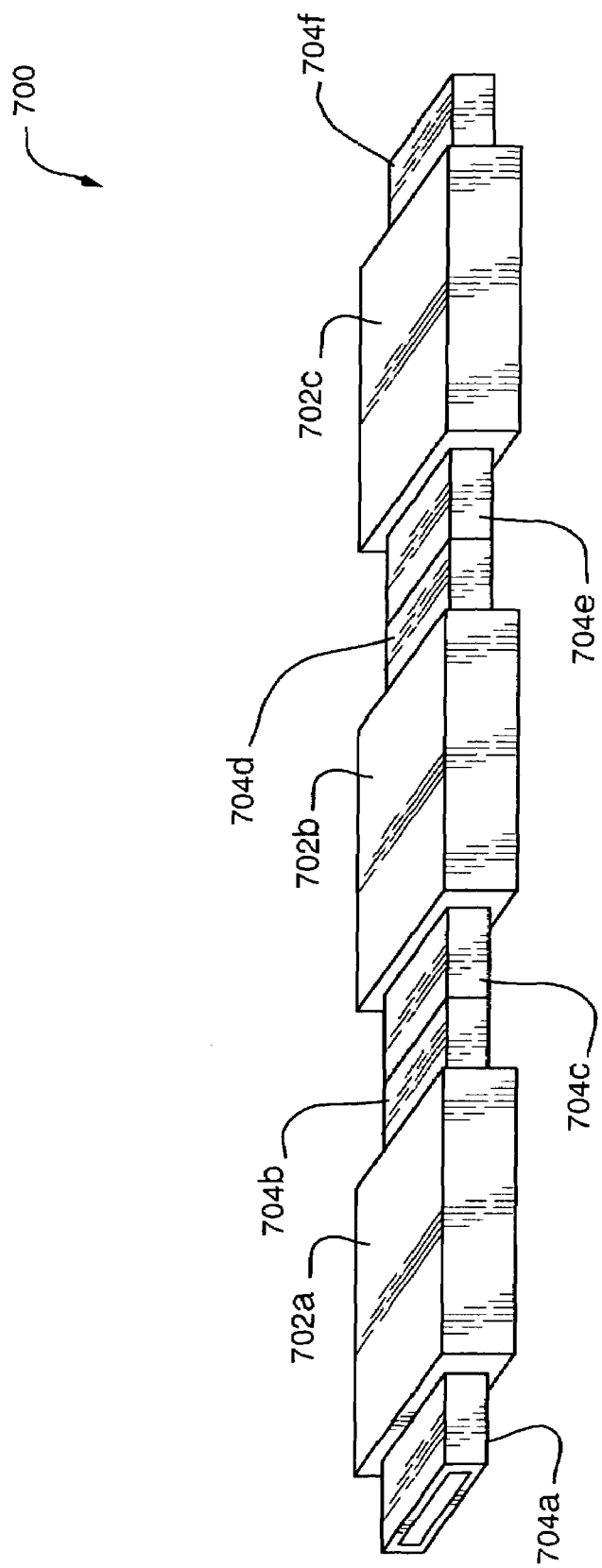
FIG. 7A is a perspective view of a plurality of components interconnected by connectors according to one embodiment of the present invention.

Referring to FIG. 7A, an interconnected component set 700 is shown in perspective view according to one embodiment of the present invention. The component set 700 includes components 702*a*, 702*b*, and 702*c*. Each of the components 702*a–c* includes two connectors, one on either side of the component. For example, component 702*a* includes connectors 704*a–b*, component 702*b* includes connectors 704*c–d*, and component 702*c* includes connectors

704*e–f*. The positioning of connectors on opposite sides of the components 702*a–c* enables the components 702*a–c* to be connected in the linear arrangement shown. It should be appreciated that additional components may be added to the component set by connecting them to an appropriate one or ones of the connectors 704*a–f*. It should further be appreciated that the particular shapes of components 702*a–c* and connectors 704*a–f* illustrated in FIG. 7A are shown merely for purposes of example and do not constitute limitations of the present invention.

The connectors 704*a–f* and any supporting hardware and/or software are examples of the component interface 304 and connectors 302*a–b* shown in FIGS. 3A–3D. The connectors 704*a–f* and any supporting hardware and/or software are also examples of devices that may be used to implement the interdevice communication modules shown in FIGS. 5A–5D.

In one embodiment of the present invention, each of the connectors 704*a–f* includes one or more of the following:
 (1) a two-wire power bus along which power may flow in either direction;
 (2) data connections including one or more of the following:
  (a) a Universal Serial Bus (USB)
  (b) an IEEE 1394 bus, sometimes referred to as a FireWire® bus;
  (c) standard video input and/or video output connectors;
  (d) standard audio input and/or audio output connectors; and
 (3) a signaling bus including one or more of the following:
  (a) an Inter-IC ($I^2C$) bus for carrying information such as device IDs, feature lists, and configuration change detection (CCD) events; and
  (b) a neighbor wire for carrying the neighbor handshaking and neighbor acknowledgement signals described above.

Figure 7B:
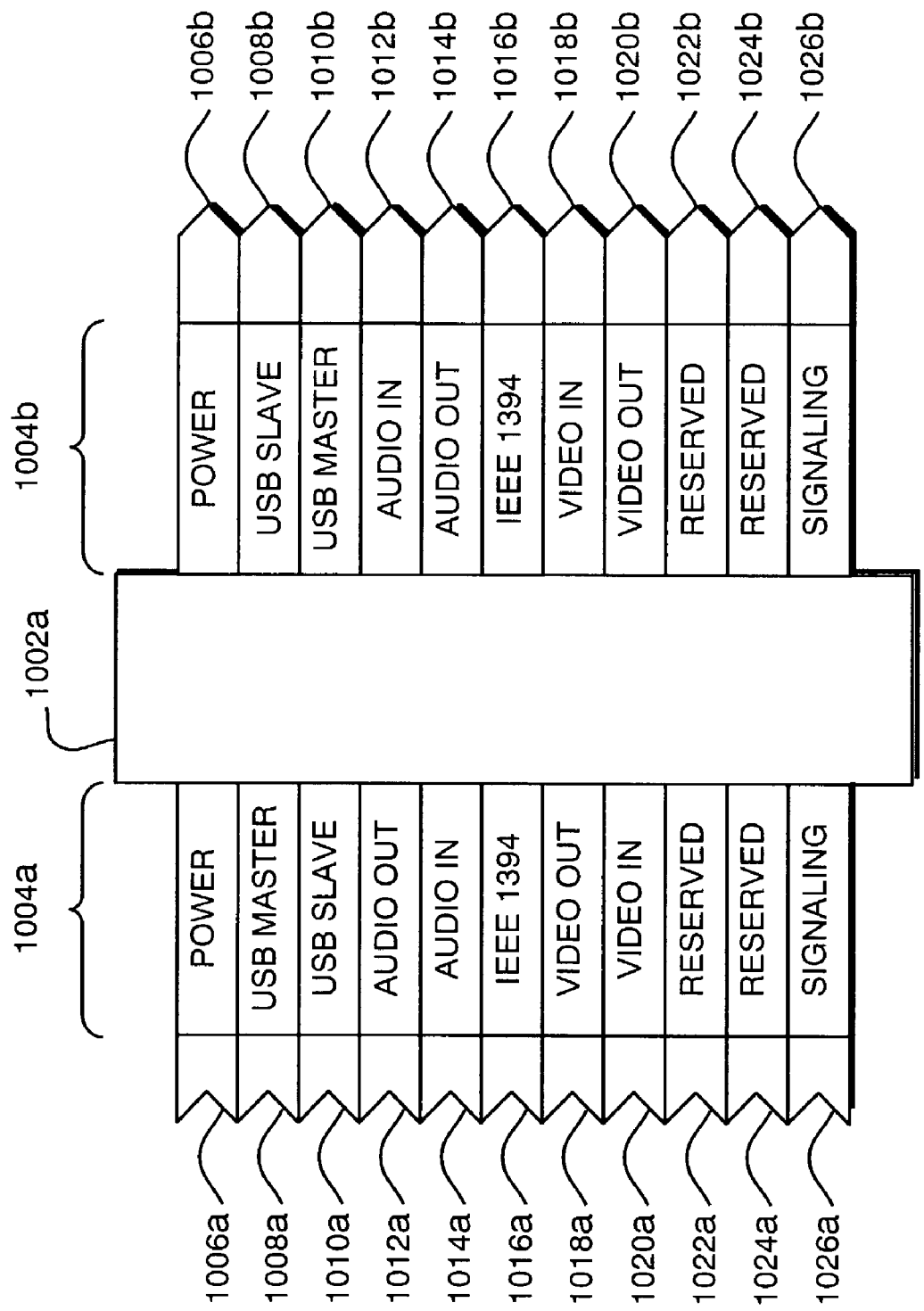
FIG. 7B is a schematic view of a component having male and female connectors according to one embodiment of the present invention.

For example, referring to FIG. 7B, a schematic diagram is shown of an example implementation of component 702*a* and its connectors 704*a* and 704*b*. As shown in FIG. 7B, in this embodiment connector 704*a* is a female connector and connector 704*b* is a male connector. Connectors 704*a–b* may be used to connect component 702*a* to a variety of busses and to transmit a variety of signals to and from component 702*a*. Although connectors 704*a–b* are described below as including a variety of "ports," each of which is illustrated in FIG. 7B as a single element, it should be appreciated that each such port may be implemented using one or more pins or other connection means as well as corresponding circuitry, as will be appreciated by those of ordinary skill in the art.

For example, female power port 706*a* and corresponding male power port 706*b* enable connection of component 702*a* to a bi-directional power bus that may run through multiple components. Component 702*a* includes female USB master port 708*a* and corresponding male USB slave port 708*b*, as well as female USB slave port 710*a* and corresponding male USB master port 710*b*, allowing connection of component 702*a* to other USB-compliant devices. Component 702*a* includes female audio out port 712*a* and corresponding male audio in port 712*b*, as well as female audio in port 714*a* and corresponding male audio out port 714*b*, allowing component 702*a* to provide audio output and receive audio input.

Component 702*a* may be connected to a bi-directional IEEE 1394 (FireWire) bus running through multiple components by means of female IEEE 1394 port 716*a* and male IEEE 1394 port 716*b*. Component 702*a* includes female video out port 718*a* and corresponding male video in port 718*b*, as well as female video in port 720*a* and corresponding male video out port 720*b*, allowing component 702*a* to provide video output and receive video input. Ports 722*a–b* and 724*a–b* are reserved for future use.

Component 702*a* may be connected to a bi-directional signaling bus by means of female signaling port 726*a* and corresponding male signaling port 726*b*. As described above, the signaling bus may include: (1) an $I^2C$ bus for carrying information such as device IDs, feature lists, and configuration change detection (CCD) events among components; and (2) a neighbor wire, connecting each component to its neighbor(s), for carrying the neighbor handshaking and neighbor acknowledgement signals described above.

It should be appreciated that the connectors 704*a–b* shown in FIG. 7B, and their respective ports, are shown merely for purposes of example and are not limitations of the present invention. Rather, a variety of connectors providing a variety of ports may be provided by various embodiments of the present invention. Furthermore, in a particular embodiment, such as that shown in FIG. 7B, in which connectors 704*a–b* implement a particular set of ports in a particular configuration, components need not include all of the ports of each connector. For example, a component that is not capable of receiving video input may not include the video input port 720*a*. More generally, each component may include any combination of ports.

Figure 7C:
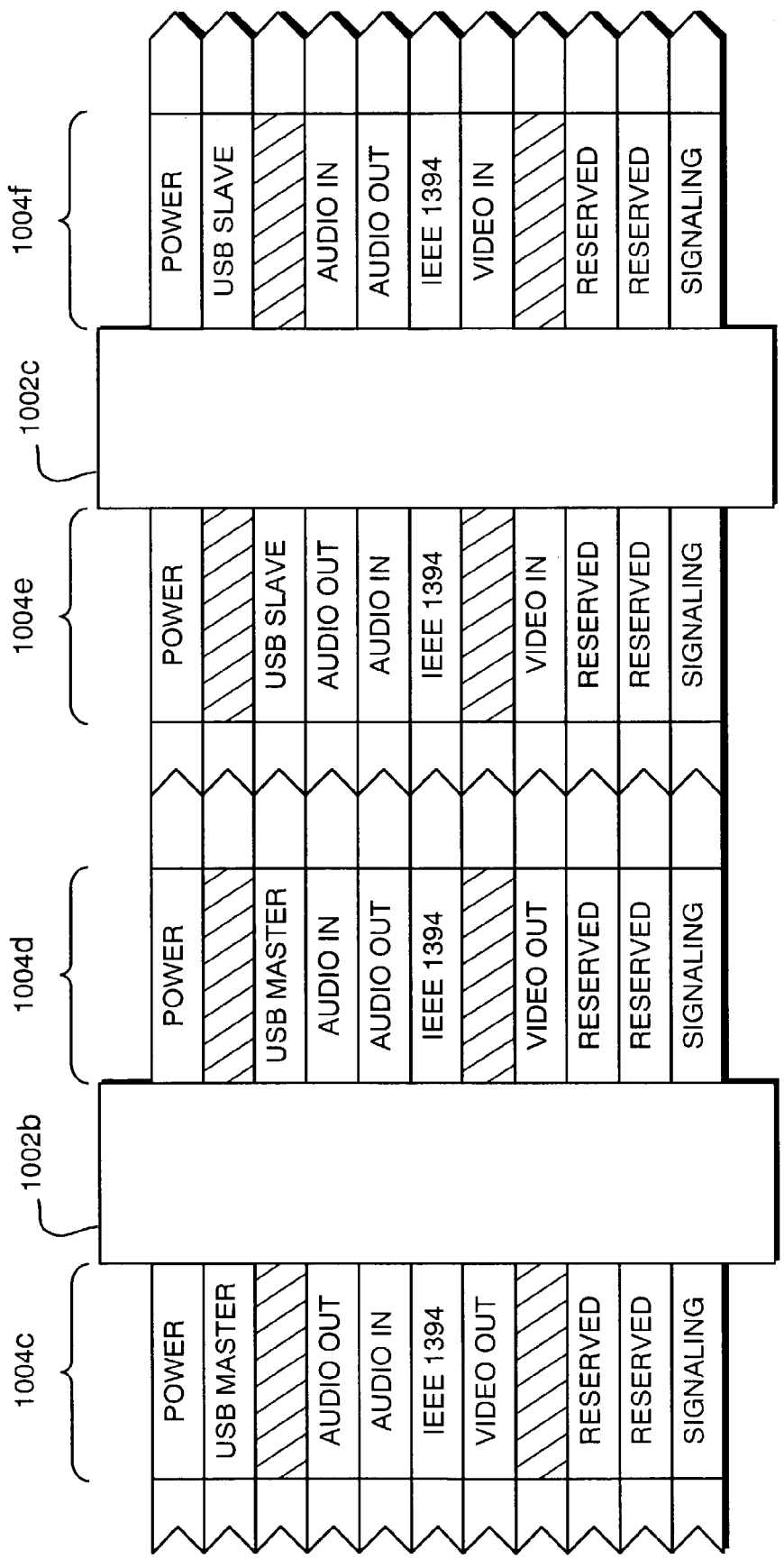
FIG. 7C is a schematic view of two interconnected components according to one embodiment of the present invention.

For example, referring to FIG. 7C, a schematic diagram is shown of interconnected components 702*b–c* according to one embodiment of the present invention. As shown in FIG. 7C, component 702*b* and component 702*c* are coupled by male connector 704*d* and female connector 704*e*, respectively. Although only two components 702*b–c* are shown in FIG. 7C, it should be appreciated that any number of additional components having similarly arranged male and female connectors may be further connected to components 702*b* and 702*c*. It should further be appreciated that components may be connected in any suitable order.

As shown in FIG. 7C, components 702*b* and 702*c* do not include all ports provided by the example connector standard shown in FIG. 7B. For example, component 702*b* includes USB master ports, but does not include USB slave ports, indicating that component 702*b* may only be used as a USB master device. Similarly, component 702*c* includes USB slave ports, but does not include USB master ports, indicating that component 702*c* may only be used as a USB slave device. In the example shown in FIG. 7C, component 702*b*'s USB master port is connected to component 702*c*'s USB slave port, indicating that component 702*b* acts as a USB master device and component 702*c* acts as a USB slave device.

Similarly, component 702*b* includes video out ports, but does not include video in ports, indicating that component 702*b* may provide video output but may not receive video input. Correspondingly, component 702*c* includes video input ports but does not include video output ports, indicating that component 702*c* may receive video input but not provide video output. As shown in FIG. 7C, the male video output port of component 702*b* is connected to the female video input port of component 702*c*, thereby enabling component 702*b* to provide video output to component 702*c*. Other connections between corresponding ports of components 702*b* and 702*c* can readily be seen in FIG. 7C.

It should be appreciated that although each of the components is shown in FIGS. 7A–7C as having a pair of connectors on either side of the component, this particular configuration arrangement of connectors is shown merely for purposes of example and does not constitute a limitation of the present invention. Rather, each component may have any number of connectors arranged in any suitable layout. Furthermore, the components 402*a–d* may have other connectors that do not conform to the interconnect standard described above. Such other connectors may include, for example, USB connectors and AC adapter jacks.

In one embodiment of the present invention, connectors constructed according to the design of the example standard connectors 704a–b are used to interconnect components. Use of such connectors in conjunction with the techniques described above for selecting particular resources to perform particular functions will now be described in more detail.

Assume for purposes of example that the component 702b shown in FIG. 7C is the core component 402a (FIG. 5A) and that he component 702c shown in FIG. 7C is the output component 402c (FIG. 5C). Also assume for purposes of example that the core component 402a and the output component 402c are not yet connected to each other or to any other component. As described above, in one embodiment, each of the components 702b–c has a unique device ID, a feature list, and a resource usage table. The feature list of the component 702b may, for example, indicate that the component is capable of providing video output. The feature list of the component 702c may indicate that the component 702c is capable of receiving video input.

Now assume that the components 702b and 702c are connected by connecting the connectors 704d and 704e to each other. In response to the formation of this connection, either or both of the components 702b–c may generate a configuration change detection (CCD) event by, for example, transmitting a signal indicating a CCD event along the I²C bus (which, as described above, is within the signaling bus). Upon receiving the CCD event, each of the components 702b–c broadcasts information about itself (such as its device ID and feature list) on the I²C bus. Each of the components 702b–c is thereby informed of the identity and features of the component(s) to which it is connected.

The components 702b–c may then perform the neighbor handshaking described above using the neighbor wires contained within the signaling bus. As a result, the component 702b will ascertain that component 702c is its neighbor, and vice versa.

The components 702b–c may then execute their configuration strategies to select resources for use to perform particular functions. For example, assume that the configuration strategy of the component 702c specifies that the component 702c may receive video input either from an internal video source (such as the microprocessor 482 shown in FIG. 5C) or from an external video source. When the component 702c executes its configuration strategy, it will decide whether to use its internal video source (e.g., the microprocessor 482) or the video source provided by the component 702b (e.g., the microprocessor 414) as a source of video. As a result of the decision made by executing the configuration strategy, the component 702c may, for example, select the chosen video source using an internal multiplexor, as described above. If the component 702c chooses the video source provided by component 702b, the component 702c will receive a video input signal through the video input port of connector 704e. It should be appreciated that certain resources may only be available for use from neighboring components, while other resources may be available from any component in the same component set.

Now consider an example in which a component requires a resource that is not supplied internally by the component. For example, now assume that the component 702c includes a display (such as the LCD 472 shown in FIG. 5C) that requires a video source, but that the component 702c does not include an internal video source for the display. Also assume for purposes of example that the component 702c includes only a single connection (such as the video input port of connector 704e) through which to receive a video source signal. In one embodiment, upon being connected to a video source through the video input port of connector 704e, the component 702c may select the connected video source for use as a source of video. This technique provides an alternative to the use of configuration strategies for the selection of resources. It should be appreciated that this technique may be used to select any kind of resource.

The resource usage tables for the components 702b–c are updated after the components 702b–c select resources (such as by using configuration strategies or the alternative technique described above). The components 702b–c may then use the selected resources. It should be appreciated that the techniques just described may be applied to any number of components interconnected in a variety of ways.

It should therefore be appreciated that the components 702a–c (and additional components) may be interconnected (using connectors 704a–f) in a variety of configurations to form a variety of computing systems. Components in such computing systems may access resources (such as functional modules or sub-components thereof) provided by other components in the computing system. Components may be added to or removed from an existing configuration to form a different computing system. Such ease of reconfiguration may provide a variety of advantages, such as reduction in size and cost, reduction or elimination of data redundancy, and increased ease of use, as described in more detail above.

In general, the techniques described above may be implemented, for example, in hardware, software, firmware, or any combination thereof. The techniques described above may be implemented in one or more computer programs executing on a processor, a storage medium readable by the processor (including, for example, volatile and non-volatile memory and/or storage elements), at least one input device, and at least one output device. Program code may be applied to data entered using the input device to perform the functions described herein and to generate output information. The output information may be provided to one or more output devices.

Elements and components described herein may be further divided into additional components or joined together to form fewer components for performing the same functions.

Each computer program within the scope of the claims below may be implemented in any programming language, such as assembly language, machine language, a high-level procedural programming language, or an object-oriented programming language. The programming language may be a compiled or interpreted programming language.

Each computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output.

It is to be understood that although the invention has been described above in terms of particular embodiments, the foregoing embodiments are provided as illustrative only, and do not limit or define the scope of the invention. Other embodiments are also within the scope of the present invention, which is defined by the scope of the claims below. Other embodiments that fall within the scope of the following claims includes include, but are not limited to, the following.

The invention claimed is:

1. A system comprising:
   a core device comprising a core computer processor, a core memory, a core storage device, a touch screen, and means for receiving input from and providing output through the touch screen in a first mode of operation of the core device;

a secondary display device;
means for coupling the core device to the secondary display device by inserting at least part of the core device into a cavity in the secondary display device; and
means for providing input received from the touch screen to the secondary display device in a second mode of operation of the core device.

2. The system of claim 1, wherein the core device operates in the first mode of operation when the core device is not coupled to the secondary display device, and wherein the core device operates in the second mode of operation when the core device is coupled to the secondary display device.

3. The system of claim 1, further comprising:
a secondary input device;
means for coupling the core device and the secondary input device to the secondary display device; and
means for providing input received from the touch screen to the secondary display device in a third mode of operation of the core device.

4. The system of claim 3, wherein the core device operates in the third mode of operation when the core device and the secondary input device are coupled to the secondary display device.

5. The system of claim 1, further comprising means for disabling output through the touch screen when the core device operates in the second mode of operation.

6. The system of claim 1, wherein the core device comprises a portable computing device.

7. In a system comprising a core device comprising a core computer processor, a core memory, a core storage device, and a touch screen, a method comprising steps of:
(A) receiving input from and providing output through the touch screen in a first mode of operation;
(B) coupling the core device to a secondary display device by inserting at least part of the core device into a cavity in the secondary display device; and
(C) providing input received from the touch screen to the secondary display device in a second mode of operation of the core device.

8. The method of claim 7, further comprising steps of:
(D) detecting that the core device has been coupled to the secondary display device; and
(E) causing the core device to enter the second mode of operation in response to the detection performed in step (D).

9. The method of claim 7, further comprising steps of:
(D) coupling the core device and a secondary input device to the secondary display device; and
(E) providing input received from the touch screen to the secondary display device in a third mode of operation of the core device.

10. The method of claim 9, comprising steps of:
(F) detecting that the core device and the secondary input device have been coupled to the secondary display device; and
(G) causing the core device to enter the third mode of operation in response to the detection performed in step (F).

11. The method of claim 7, further comprising a step of:
(D) disabling the touch screen output means when the core device operates in the second mode of operation.

12. The method of claim 7, wherein the core device comprises a portable computing device.

13. A core device comprising:
a core computer processor;
a core memory;
a core storage device;
a touch screen comprising touch screen input means and touch screen output means;
means for receiving input from and providing output through the touch screen in a first mode of operation of the core device;
means for entering a second mode of operation when at least part of the core device is inserted into a cavity in the secondary display device; and
means for providing input received from the touch screen to a secondary display device in the second mode of operation of the core device.

14. The core device of claim 13, further comprising:
means for entering the first mode of operation when the at least part of the core device is not inserted into the cavity in the secondary display device.

15. The core device of claim 13, further comprising:
means for coupling the core device and a secondary input device to the secondary display device; and
means for providing input received from the touch screen to the secondary display device in a third mode of operation of the core device.

16. The core device of claim 15, wherein the means for providing input comprises means for providing input received from the touch screen to the secondary display device only when the core device and the secondary input device are coupled to the secondary display device.

17. The core device of claim 13, wherein the core device comprises a portable computing device.

18. In a core device comprising a core computer processor, a core memory, a core storage device, and a touch screen comprising touch screen input means and touch screen output means, a method comprising steps of:
(A) receiving input from and providing output through the touch screen in a first mode of operation;
(B) entering a second mode of operation when at least part of the core device is inserted into a cavity in the secondary display device; and
(C) providing input received from the touch screen to a secondary display device in the second mode of operation of the core device.

19. The method of claim 18, wherein the step (C) comprises steps of:
(C) (1) determining whether the core device is coupled to the secondary display device; and
(C) (2) providing input received from the touch screen to the secondary display device only when the core device is determined to be coupled to the secondary display device.

20. The method of claim 18, wherein the step (A) comprises steps of:
(A) (1) determining whether the core device is coupled to the secondary display device; and
(A) (2) providing output through the touch screen only when the core device is determined not to be coupled to the secondary display device.

21. The method of claim 18, wherein the core device comprises a portable computing device.

22. The system of claim 1, wherein the means for providing input comprises tracking means for tracking movement of an object on the surface of the touch screen.

23. The system of claim 22, wherein the tracking means comprises means for moving a cursor displayed on the secondary display device to track the movement of the object on the surface of the touch screen.

24. The system of claim 23, wherein the object comprises a finger.

25. The method of claim 7, wherein step (C) comprises steps of:
- (C) (1) receiving the input from the touch screen in the second mode of operation, the input representing a movement of an object on the touch screen;
- (C) (2) providing the input to the secondary display device; and
- (C) (3) moving a displayed cursor on the secondary display device to indicate the movement of the object.

26. The method of claim 25, wherein the object comprises a finger.

27. The core device of claim 13, wherein the means for providing input comprises:
- means for receiving the input from the touch screen in the second mode of operation, the input representing a movement of an object on the touch screen;
- means for providing the input to the secondary display device; and
- means for moving a displayed cursor on the secondary display device to indicate the movement of the object.

28. The core device of claim 27, wherein the object comprises a finger.

29. The method of claim 18, wherein step (C) comprises steps of:
- (C) (1) receiving the input from the touch screen in the second mode of operation, the input representing a movement of an object on the touch screen;
- (C) (2) providing the input to the secondary display device; and
- (C) (3) moving a displayed cursor on the secondary display device to indicate the movement of the object.

30. The method of claim 29, wherein the object comprises a finger.

* * * * *